(12) United States Patent (10) Patent No.: US 8,585,517 B2
Donahoe (45) Date of Patent: Nov. 19, 2013

(54) SYSTEMS AND METHODS FOR ARCHERY EQUIPMENT

(75) Inventor: Robert V. Donahoe, Newton, MA (US)

(73) Assignee: Full Flight Technology, LLC, Cambridge, MA (US)

( * ) Notice: Subject to any disclaimer, the term of this patent is extended or adjusted under 35 U.S.C. 154(b) by 0 days.

(21) Appl. No.: 13/617,725

(22) Filed: Sep. 14, 2012

(65) Prior Publication Data

US 2013/0012343 A1 Jan. 10, 2013

Related U.S. Application Data

(60) Continuation of application No. 13/107,561, filed on May 13, 2011, now Pat. No. 8,282,517, which is a division of application No. 12/016,019, filed on Jan. 17, 2008, now Pat. No. 7,972,230.

(60) Provisional application No. 60/881,125, filed on Jan. 18, 2007.

(51) Int. Cl.
*F42B 6/04* (2006.01)

(52) U.S. Cl.
USPC .......................................................... 473/578

(58) Field of Classification Search
USPC .......................................................... 473/578
See application file for complete search history.

(56) References Cited

U.S. PATENT DOCUMENTS

| | | | |
|---|---|---|---|
| 3,790,948 A * | 2/1974 | Ratkovich | 342/386 |
| 4,421,319 A * | 12/1983 | Murphy | 473/570 |
| 4,547,837 A | 10/1985 | Bennett | |
| 4,675,683 A * | 6/1987 | Robinson et al. | 342/386 |
| 4,704,612 A * | 11/1987 | Boy et al. | 342/386 |
| 4,749,198 A * | 6/1988 | Brailean | 473/570 |
| 4,845,690 A | 7/1989 | Oehler | |
| 4,989,881 A * | 2/1991 | Gamble | 473/570 |
| 5,058,900 A | 10/1991 | Denen | |
| 5,141,229 A * | 8/1992 | Roundy | 473/570 |
| 5,157,405 A * | 10/1992 | Wycoff et al. | 342/386 |
| 5,425,542 A | 6/1995 | Blackwood et al. | |
| 5,988,645 A | 11/1999 | Downing | |
| 6,027,421 A | 2/2000 | Adams, Jr. | |
| 6,029,120 A | 2/2000 | Dilger | |
| 6,191,574 B1 | 2/2001 | Dilger | |
| 6,209,820 B1 | 4/2001 | Golan et al. | |
| 6,390,642 B1 * | 5/2002 | Simonton | 362/203 |
| 6,604,946 B2 | 8/2003 | Oakes | |
| 6,623,385 B1 | 9/2003 | Cole et al. | |

(Continued)

FOREIGN PATENT DOCUMENTS

KR 200272126 4/2002

OTHER PUBLICATIONS

Paul E. Klopsteg, "Physics of Bows and Arrows", American Journal of Physics, Aug. 1943, vol. 11, pp. 175-192.

(Continued)

*Primary Examiner* — John Ricci
(74) *Attorney, Agent, or Firm* — Rhodes Donahoe, LLC

(57) ABSTRACT

An apparatus is configured for inclusion in an arrow. In one embodiment, the apparatus includes a sensor configured to provide data concerning one or more flight characteristics of the arrow in flight and a communication link coupled to the sensor, the communication link configured to communicate the data to a device external to the arrow.

19 Claims, 16 Drawing Sheets

(56) References Cited

U.S. PATENT DOCUMENTS

| | | | |
|---|---|---|---|
| 6,758,773 | B1 | 7/2004 | Liao |
| 7,095,312 | B2 * | 8/2006 | Erario et al. ............... 340/323 R |
| 7,115,055 | B2 | 10/2006 | Palomake et al. |
| 7,165,543 | B2 | 1/2007 | Simo et al. |
| 7,316,625 | B2 * | 1/2008 | Takahashi ..................... 473/578 |
| 7,331,887 | B1 * | 2/2008 | Dunn ........................... 473/578 |
| 7,337,773 | B2 | 3/2008 | Simo et al. |
| 2002/0123386 | A1 | 9/2002 | Perlmutter |
| 2002/0134153 | A1 | 9/2002 | Grenlund |
| 2004/0014010 | A1 * | 1/2004 | Swensen et al. ................ 434/21 |
| 2005/0288119 | A1 | 12/2005 | Wang et al. |
| 2006/0052173 | A1 | 3/2006 | Telford |
| 2008/0176681 | A1 | 7/2008 | Donahoe |
| 2008/0287229 | A1 | 11/2008 | Donahoe |

OTHER PUBLICATIONS

International Search Report from corresponding International Application No. PCT/US2008/051344 (dated May 14, 2008).

Easton, "Arrow Tuning and Maintenance Guide", Apr. 1999, 2nd Edition, pp. 1-32, Salt Lake City, Utah.

Davey T.W. Fong, Joe C.Y. Wong, Alan H.F. Lam, Raymond H.W. Lam, Wen J. Li, "a Wireless Motion Sensing System Using ADLX MEMS Accelerometers for Sports Science Applications", pp. 5635-5640, Proceedings of the 5th World Congress on Intelligent Control and Automation, Jun. 15-19, 2004, Hangzhou, P.R. China.

Anwar Sadat, Hongwei Qu, Chuanzhao Yu, Jiann S. Yuan, Huikai, "Low-Power CMOS Wireless MEMS Motion Sensor for Physiological Activity Monitoring", IEEE Transactions on Circuits and Systems, Dec. 2005, vol. 52, No. 12, pp. 2539-2551.

O'Flynn et al., "The Development of a Novel Miniaturized Modular Platform for Wireless Sensor Networks", Proc. The Fourth International Conference on Information Processing in Sensor Networks (ISPN'05), UCLA, Los Angeles, California, US, pp. 370-375, Apr. 24-27, 2005.

Barton et al., "Design, Fabrication and Testing of Miniaturised Wireless Inertial Measurement Units (IMU)", Electronic Components and Technology Conference 2007, pp. 1143-1148, May 29-Jun. 1, 2007.

Srinivasan et al., "Towards automatic detection of falls using wireless sensors", Proc. 29th Annual International Conference of the IEEE EMBS Cite Internationale, Lyon, France, pp. 1379-1382, Aug. 23-26, 2007.

Chung et al., "A Fusion Health Monitoring Using ECG and Accelerometer sensors for Elderly Persons at Home", Proc. 29th Annual International Conference of the IEEE EMBS Cite Internationale, Lyon, France, pp. 3818-3821, Aug. 23-26, 2007.

Lee et al., "Implementation of Accelerometer Sensor Module and Fall Detection Monitoring System based on Wireless Sensor Network", Proc. 29th Annual International Conference of the IEEE EMBS Cite Internationale, Lyon, France, pp. 2315-2318, Aug. 23-26, 2007.

Purwar et al., "Activity Monitoring from Real-Time Triaxial Accelerometer data using Sensor Network", International Conference on Control Automation and Systems 2007, in COEX, Seoul, Korea, pp. 2402, Oct. 17-20, 2007.

Hyatt, C., "Wireless Stimulus-Reflex Detection for Neonatal Monitoring", Circuits and Systems, 2007. ISCAS 2007. IEEE International Symposium, pp. 565-568, May 27-30, 2007.

Tapia et al., "Real-Time Recognition of Physical Activities and Their Intensities Using Wireless Accelerometers and a Heart Rate Monitor", Boston MA, Oct. 11-13, 2007.

* cited by examiner

SYSTEMS AND METHODS FOR ARCHERY EQUIPMENT

RELATED APPLICATIONS

This application is a continuation of, and claims priority under 35 U.S.C. §120 to co-pending U.S. patent application Ser. No. 13/107,561 entitled "Systems and Methods for Archery Equipment," filed on May 13, 2011 which is divisional of, and claims priority under 35 U.S.C. §120 and §121 to U.S. Pat. No. 7,972,230 entitled "Systems and Apparatus for Archery Equipment," issued on Jul. 5, 2011, which claims the benefit under 35 U.S.C. §119(e) to U.S. Provisional Application Ser. No. 60/881,125, entitled "SYSTEMS AND METHODS FOR ARCHERY EQUIPMENT," filed on Jan. 18, 2007, each of the preceding are incorporated herein by reference in their entirety.

BACKGROUND OF THE INVENTION

1. Field of the Invention

Embodiments of the invention generally relate to archery equipment. More specifically, at least one embodiment, relates to systems and methods employing an arrow-mounted electronic apparatus.

2. Discussion of Related Art

The velocity of an arrow shot from a bow may be measured to determine the effectiveness of the archery equipment, for example, a combination of a particular bow and arrow.

A ballistic-type chronograph is typically employed to measure the velocity of an arrow. A chronograph consists of two or more sensing elements that provide separate openings "shooting windows" through which the projectile travels consecutively after it is discharged from the bow. The sensing elements are separated a known distance apart (generally, a relatively small and fixed distance apart) and the chronograph determines the velocity by calculating the elapsed time between the moment the arrow travels through an opening of a first sensing element and the moment the arrow travels through an opening of a second sensing element. Some approaches employ a single pair of sensing elements while other approaches employ three sensing elements to determine a measurement error of the instrument.

Regardless of which of the above approaches is employed, the chronograph can only provide information concerning an average velocity of the arrow as it travels between sensing elements. Further, even the average velocity is only determined using data from a maximum of three locations along the flight path. That is, once the location of the sensing elements is established on the flight path of the arrow, the chronograph becomes a fixed device that can only determine an average velocity of the arrow at those locations along the flight path. Further, many chronographs provide sensing elements that are located a fixed distance apart which further limits their utility.

In general, the sensing elements are located in the vicinity of the archer, for example, within 10 feet of the archer. Thus, the chronograph does not provide any measurements concerning the arrow either prior to its travel through the first sensing element or after its exit from the sensing element located the farthest down range. Accordingly, a chronograph provides a user with a very limited amount of information concerning the velocity of the arrow.

In addition, the shooting windows provided by the sensing elements must be properly aligned with the flight path of the arrow. Failure to do so will result in a failed measurement and possible destruction of the chronograph should the arrow accidentally strike a misaligned sensing element.

The flight of an arrow may be improved through a process referred to as tuning. Currently, however, tuning is primarily accomplished by a process referred to as "paper tuning." This approach is rather rudimentary as it involves positioning a sheet of paper downrange and relatively close to the archer (usually 10 yards or less), shooting an arrow through the center of the sheet of paper and evaluating whether the arrow's flight, and consequently the equipment adjustments, are acceptable based on the tear-pattern observed in the paper. Here too, the archer is provided with only a very limited amount of information, at least, because the flight of the arrow is evaluated based on its performance at a single point along the flight path.

SUMMARY OF THE INVENTION

In some embodiments, the invention provides apparatus and methods that provide a user with information concerning a flight of an arrow. The information may be provided by an electronic apparatus that is, for example, configured for inclusion in the arrow. According to one embodiment, the apparatus includes a wireless transmitter and an accelerometer in electrical communication with the wireless transmitter. In a version of this embodiment, the wireless transmitter and accelerometer are included in an arrow tip. In one embodiment, the accelerometer is configured to supply an acceleration signal, and the wireless transmitter is configured to transmit data corresponding to the acceleration signal. Thus, some embodiments can provide a user with information concerning the flight of the arrow throughout the flight path of the arrow. That is, the apparatus can provide a user (e.g., the archer) with information concerning the flight of the arrow from the moment the bowstring is released until the flight is completed, for example, when the arrow comes to rest in the target.

Further, some embodiments allow the determination of an instantaneous velocity of the arrow. Further still, some embodiments allow the determination of an instantaneous velocity of the arrow at a plurality of locations along the flight path. In a version of this embodiment, the instantaneous velocity may be determined at four or more locations along the flight path of the arrow. Some embodiments can provide information concerning additional flight characteristics of the arrow for a plurality of locations along the flight path.

In accordance with one aspect, an apparatus is configured for inclusion in an arrow. In one embodiment, the apparatus includes a sensor configured to provide data concerning one or more flight characteristics of the arrow in flight and a communication link coupled to the sensor, the communication link configured to communicate the data to a device external to the arrow.

In accordance with another aspect, an arrow tip includes a sensor configured to provide data concerning one or more flight characteristics of an arrow in which the arrow tip is included and a communication link coupled to the sensor, the communication link configured to communicate data to a device external to the arrow.

In accordance with a further aspect, the invention provides a method of determining at least one flight characteristic of an arrow in flight where the method includes the acts of generating data concerning the at least one flight characteristic of the arrow with a sensor included in the arrow and communicating the data to a device external to the arrow.

In accordance with yet another aspect, a system for tuning archery equipment includes an arrow-mounted sensor configured to provide data concerning at least one flight characteristic of an arrow shot from a bow and a processing device configured to receive data provided by the arrow mounted sensor and to generate information concerning an adjustment of the archery equipment to improve a performance of arrows shot from the bow based at least in part on the data provided by the arrow-mounted sensor.

In accordance with still another aspect, the invention provides a method of improving a performance of an arrow shot from a bow where the method includes acts of collecting data with a sensor included in the arrow, the data concerning flight characteristics of the arrow when shot from the bow and generating, based on the collected data, at least one recommended adjustment to improve a subsequent flight of the arrow.

In accordance with still a further aspect, the invention provides a method of modeling a performance of an archery system where the method includes acts of (a) selecting a combination of archery equipment including a bow and an arrow, (b) providing the archery equipment with a first selected set of adjustments, (c) determining, based on data provided by a sensor included in the arrow, flight characteristics of the arrow shot from the bow when the selected combination of archery equipment is employed with the selected set of adjustments. In accordance with one embodiment, if the flight characteristics are insufficient to achieve a desired performance of the archery system, the method includes an act of (d) providing the archery equipment with a second selected set of adjustments and repeating act (c) and if the flight characteristics are sufficient to achieve the desired performance of the archery system, the method includes the act of (e) establishing a set of adjustments that achieves the desired performance as a recommended set of adjustments for the selected combination.

In still another aspect, an adapter for securing an arrow tip to an arrow includes a power source, and at least one electrical contact for coupling the power source to the arrow tip when the arrow tip is received by the adapter.

In a further aspect, a system provides power to electronic equipment included in an arrow tip where the system includes an adapter including a power source and a contact element configured to be secured between the adapter and the arrow tip when the arrow tip is received by adapter to provide an electrical connection between the power source and the electronic equipment.

DESCRIPTION OF THE DRAWINGS

The accompanying drawings are not intended to be drawn to scale. For purposes of clarity, not every component may be labeled in every drawing. In the drawings.

DETAILED DESCRIPTION

Figure 1:
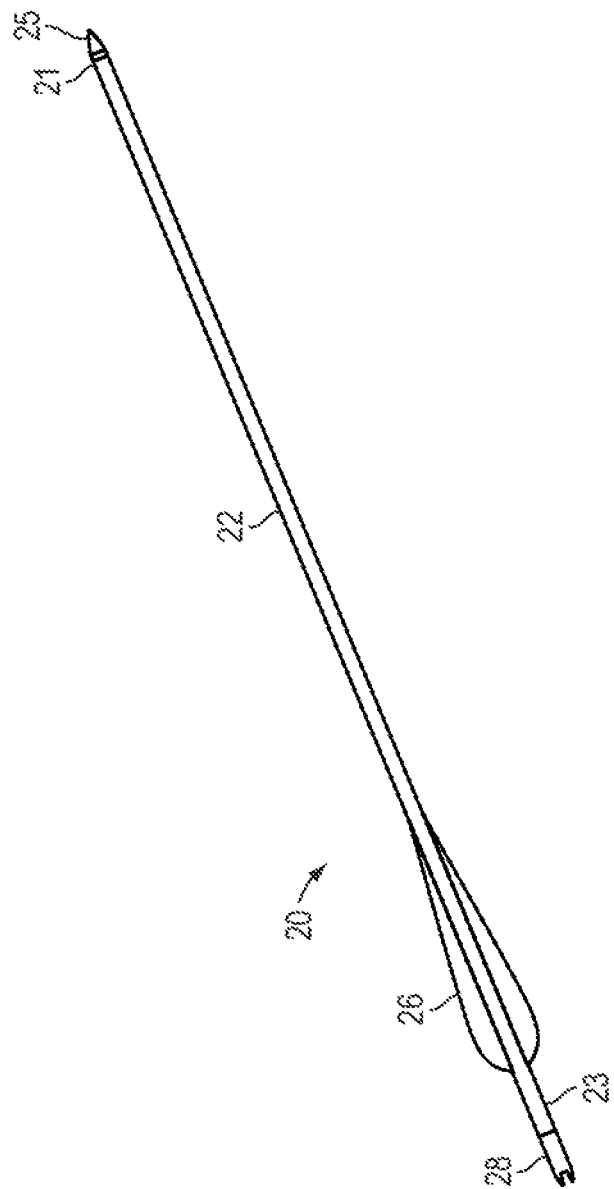
FIG. 1 illustrates a conventional arrow.

FIG. 1 illustrates a conventional arrow 20 suitable for use with various embodiments of the invention described below. The arrow 20 includes a shaft 22, a tip 25, vanes 26, and a nock 28. In one embodiment the shaft 22 is a tubular shaft with a hollow central region located concentrically relative to the exterior walls of the shaft. The tip 25 may be provided in a variety of configurations including field/target points, fixed-blade broadheads, mechanical broadheads and any other tips that are adapted to secure at the distal end 21 of the arrow. The tip 25 may be secured to the arrow shaft or provided as an integral component thereof. For example, in some embodiments, an adapter 30 may be employed to attach to the shaft 22 and receive the tip 25. In one embodiment, the arrow includes an adapter 30, which is located within the shaft 22 at the distal end 21, and the tip 25 is secured to the adapter 30. According to one embodiment, the adapter 30 is inserted within the shaft 22 (e.g., an "insert") and secured therein using epoxy adhesive. In a further embodiment, the adapter 30 includes a threaded receptacle. According to this embodiment, the tip 25 may include a corresponding threaded portion that may be threaded into the adapter 30. The adapter 30 can, however, include any structure to provide a means of securing the tip 25 to the shaft 22.

In other embodiments, the tip 25 includes structure that is integral to it that allows it to be directly secured to the shaft 22 without the aid of the adapter 30, i.e., the adapter may not be employed. For example, the tip 25 may be configured to be glued to the shaft 22. In still another embodiment, the adapter 30 can include an "outsert." That is, an adapter (e.g., the adapter 30) may be employed for attaching the tip 25 to the shaft 22. According to this embodiment, however, the adapter is configured to slide over the outside walls of the shaft 27. In a version of this embodiment, the adapter is affixed to the shaft 22 using epoxy.

The term vanes 26 generally refers to a plastic (solid or mostly solid) stabilizing device affixed to the shaft 22. Those of ordinary skill in the art understand that feathers may optionally be employed instead of vanes. The nock 28 may be attached at the proximate end 23 of the shaft 22 and provides a slot suitable for engagement with a bow string when the arrow is placed in the bow. Generally, a portion of the nock is either slid over or within the shaft 22 and is affixed to the shaft with an epoxy adhesive. In other embodiments, the nock is attached to the shaft with an adapter or other device configured to provide a means of mating the hardware of the nock to the hardware configuration of the shaft, i.e., the nock 28 is not directly secured to the shaft 22.

Figure 2:
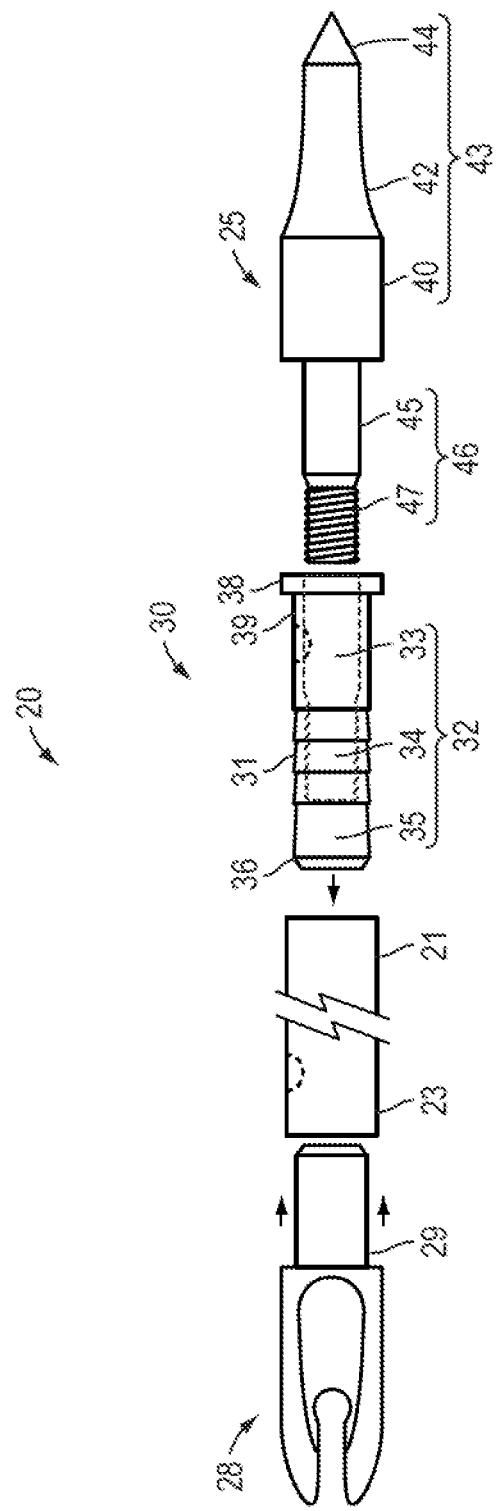
FIG. 2 illustrates an arrow in accordance with an embodiment of the invention.

Referring now to FIG. 2, an exploded view of the arrow 20 of FIG. 1 is illustrated in accordance with one embodiment. The distal end 21 and the proximate end 23 are the only portions of the shaft 22 that are illustrated in FIG. 2 to allow for details concerning the tip 25, nock 28 and adapter 30. In the illustrated embodiment, the adapter 30 is a threaded insert, i.e., the adapter 30 is configured to insert within the distal end 21 of the shaft 22. Accordingly, in the illustrated embodiment, the shaft 22 is a hollow or at least partially hollow cylindrical tube. The nock 28 includes a shaft 29 that is configured to insert within the proximate end 23 of the shaft 22 of the arrow. Those of ordinary skill in the art will recognize that other configurations may be employed to affix the adapter 30 and the nock 28 to the shaft 22. For example, either or both of the adapter 30 and the nock 28 may include a hollow region configured to slide over the outside of the arrow shaft 22 or over other structure located at the distal and proximate ends of the shaft, respectively. In some further embodiments, either or both of the tip 25 and the nock 28 are formed as an integral portion of the shaft 22.

As described in greater detail below, some embodiments of the arrow 20 may include sensors, circuitry and/or electronics in any one of or any combination of the tip 25, the adapter 30, the nock 28 and the arrow shaft 22.

In the illustrated embodiment, the adapter 30 includes a body 31 having an internal cavity 32. The internal cavity 32 may include a plurality of regions where at least some of the regions are configured to receive at least a part of the tip 25. In a further embodiment, at least one of the regions is defined by threaded sidewalls. For example, in one embodiment, the adapter 30 includes a first region 33, a second region 34 and a third region 35. In a further embodiment, the first region includes a first diameter defined by smooth sidewalls. The first region may be adjacent to the second region 34 which is defined by threaded side walls which, in one embodiment, form a cavity having a second diameter that is less than the diameter of the first region 33. In still a further embodiment, the second region is adjacent a third region 35 that includes a third diameter that is less than each of the first diameter and the second diameter. As illustrated in FIG. 2, each of the regions may be connected to one another. Further, in some embodiments, the third region 35 is connected to an opening (not illustrated) located at a proximate end 36 of the adapter 30. In various embodiments, each of the first, second and third region are located coaxially about the longitudinal axis of the adapter 30.

In accordance with one embodiment, the adapter 30 includes a flange 38 located at a distal end 39 of the adapter 30. In a further embodiment, the first region 33 extends to the distal end 39 where it defines an opening (not shown). In one embodiment, the outside diameter of the flange 38 is substantially equal to the outside diameter of the shaft 22 with which it is used. Further in one embodiment, the body 31 includes one or more ridges 32 or other structure located about (either longitudinally or about the circumference) of the body 31 to assist in securing the adapter 30 within the shaft 22.

As mentioned above, embodiments of the invention may be employed with tips (e.g., the tip 25) of various styles and types. According to the embodiment shown in FIG. 2, the tip 25 is a field point such as those commonly employed in target shooting. In accordance with one embodiment, the tip 25 includes a shoulder 40, a tapered region 42, a point 44, and a shaft 46. According to one embodiment, a body 43 of the tip includes the shoulder 40, the tapered region 42 and the point 44. In a version of this embodiment, the body 43 includes the portions of the tip that remain external to the shaft 22 when the tip 25 is included in the arrow 22. In one embodiment, the shaft 46 includes a first region 45 having a first diameter and a second region 47 having a second diameter. In a further embodiment, at least one of the first region and the second region includes threads configured to mate with threads included in the adapter 30. In one embodiment, the shoulder 40 includes a diameter that is substantially equal to the diameter of the arrow shaft 22 with which it is used.

Various other embodiments of the tip 25 may include a body (e.g., the body 43) with a different shape. For example, the body may include a continuous taper extended from the proximate end of the shoulder 40 to the point 44. Alternatively, additional regions having diameters that differ from one another may be included in the body 43. These regions may be of a uniform diameter or alternatively may also include a varying diameter, e.g., they may taper. The body may also be configured for a specialized application such as a blunt tip or a "judo" tip that may be employed to harvest birds and other small game.

Various embodiments may attach the tip 25 to the arrow 20 using different structure than that illustrated in FIG. 2. For example, the adapter 30 may take different forms and/or provide different structure for securing the tip 25. According to one such embodiment, the cavity 32 is sized and configured to provide a friction fit such that an unthreaded shaft included in the tip 25 can be received within the cavity 32 with a friction fit. According to one embodiment, either or both of the shaft 46 and the body 31 include a resilient material that improves the fit by compressing when the shaft 46 is received within the cavity 32. Various embodiments may not include threads in either or both of the adapter 30 and the tip 25. For example, at least one of the adapter 30 and the tip 25 may include a sliding attachment means that can be rotated, depressed and/or extended to allow the element (i.e., the adapter 30 or tip 25) to receive and capture the corresponding element. For example, in one embodiment, the adapter 30 includes a sliding attachment means located about the opening to the cavity 32. According to this embodiment, the sliding attachment means prevents the insertion (or removal) of the shaft 46 (e.g., an unthreaded shaft) into (or out of) the cavity 32 unless the sliding attachment means is placed in an unlocked position. With the sliding attachment means placed in the unlocked position, the shaft 46 can be received within the cavity 32. The sliding attachment means may then be released and/or otherwise moved to the locked position in which the shaft 46 is trapped within the cavity 32 until the sliding attachment means is returned to the unlocked position. As result, in one embodiment, the adapter is configured to provide a "quick-disconnect" for securing and releasing the tip 25 without the need to thread/unthread components.

According to another embodiment, the adapter 30 can include a shaft extending from the distal end 39 while the tip 25 includes a cavity sized and configured to receive the shaft included with the adapter, i.e., the adapter 30 provides the male element and the tip 25 provides the female element. The cavity and the shaft may also include threads in a version of this embodiment. Further, in other embodiments, the tip 25 may be attached to the shaft 22 without employing the adapter 30, i.e., the tip 25 is directly attached to the shaft 22.

Figure 3:
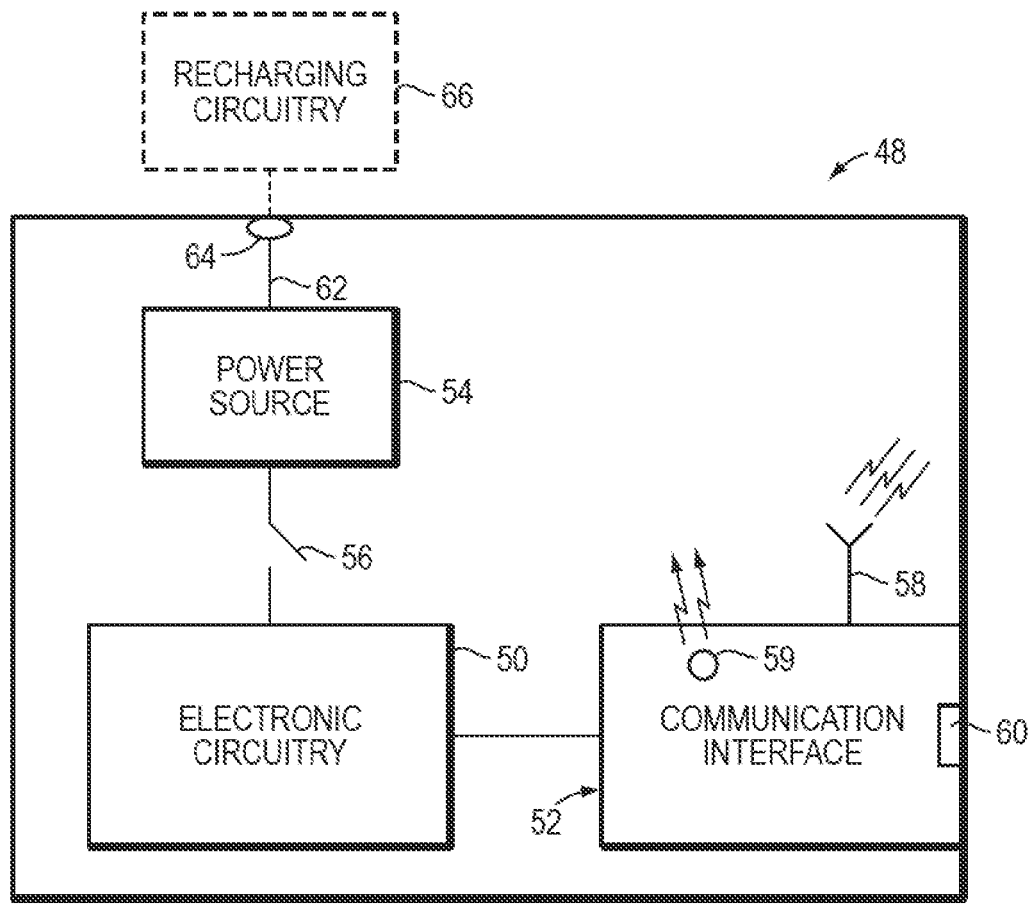
FIG. 3 illustrates a block diagram of an electronic device in accordance with one embodiment of the invention.

FIG. 3 illustrates a block diagram of an electronic apparatus 48 for use with an arrow in accordance with one embodiment. According to one embodiment, the apparatus 48 includes electronic circuitry 50, a communication interface 52 and a power source 54. In a further embodiment, the power source 54 is connected to the electronic circuitry 50 by a switch 56. In some embodiments, the apparatus is configured to transmit information concerning the flight of the arrow 20, the location of the arrow 20 and/or information concerning the surrounding environment where the arrow 20 is located. These embodiments may provide an apparatus that includes an accelerometer, a tracking device, a locating device, a camera, a microphone and/or other elements.

In accordance with some embodiments, the communication interface 52 may include any of an antenna 58 to transmit RF signals, an optical signal source (e.g., a LED) 59 and/or a communication port 60, any combination of the preceding or any of the preceding in combination with other communication devices. According to one embodiment, the optical signal source 59 transmits optically encoded signals. According to another embodiment, the communication port 60 provides a location for connecting a hardwired communication link such as a USB communication or other serial communication link. The communication port may be configured for other forms of data communication including a parallel communication link.

Further, embodiments may provide communication circuitry to transmit information in a suitable format via a suitable communication means. For example, embodiments may employ one or more of optical signals, audio signals, wireless RF signals and hardwired data communication via a communication port/interface.

The power source 54 may be any type of portable power source suitable for powering electronic circuitry in a form factor suitable for location in an arrow or part thereof. According to one embodiment, the power source 54 is a battery (for example, a coin cell battery). In a further embodiment, the power source is a rechargeable power source such as a lithium battery. Further the power source 54 may be either integral to the apparatus 48 or external to it. In any of these embodiments, the power source 54 may be a removeable power source that can be removed and/or replaced.

According to one embodiment, the apparatus 48 includes circuitry 62 that may include one or more connections 64 (e.g., a port, electrical contact and/or contact surface) for connecting the power source 54 to recharging circuitry 66. The recharging circuitry 66 may take any of a variety of forms. Accordingly, the recharging circuitry 66 may include power conversion circuitry and/or current limiting circuitry to provide for controlled recharging of a discharged or partially discharged power source 54.

In accordance with one embodiment, the recharging circuitry 66 is included in a charging device that is sized and shaped to receive the apparatus 48 including an integral power source (e.g., the power source 54) within it. Further, these embodiments may be configured to complete the connection between the power source 54 and the recharging circuitry 66 when the charging device receives the electronic apparatus 48.

Embodiments of the apparatus may be included in conventional arrows such as the arrow 20 and other archery equipment. For example, embodiments of the apparatus 48 may be included solely in the arrow shaft 22, solely in the arrow tip 25, in a combination of both the arrow shaft 22 and the arrow tip 25 or in any of the preceding in combination with other components of the arrow 20 or other archery equipment. In one embodiment, the electronic apparatus 48 is fully integrated in the arrow tip 25. In another embodiment, at least a part of the electronic apparatus 48 is included in the nock 28. In a version of this embodiment, the electronic apparatus 48 is fully integrated in the nock. In various embodiments, the electronic apparatus 48 is included in conventional archery equipment, such as the arrow 20, such that the flight characteristics of the arrow equipped with the electronic apparatus 48 are substantially the same as the flight characteristics of the arrow 20 without the electronic apparatus 48.

Figure 4:
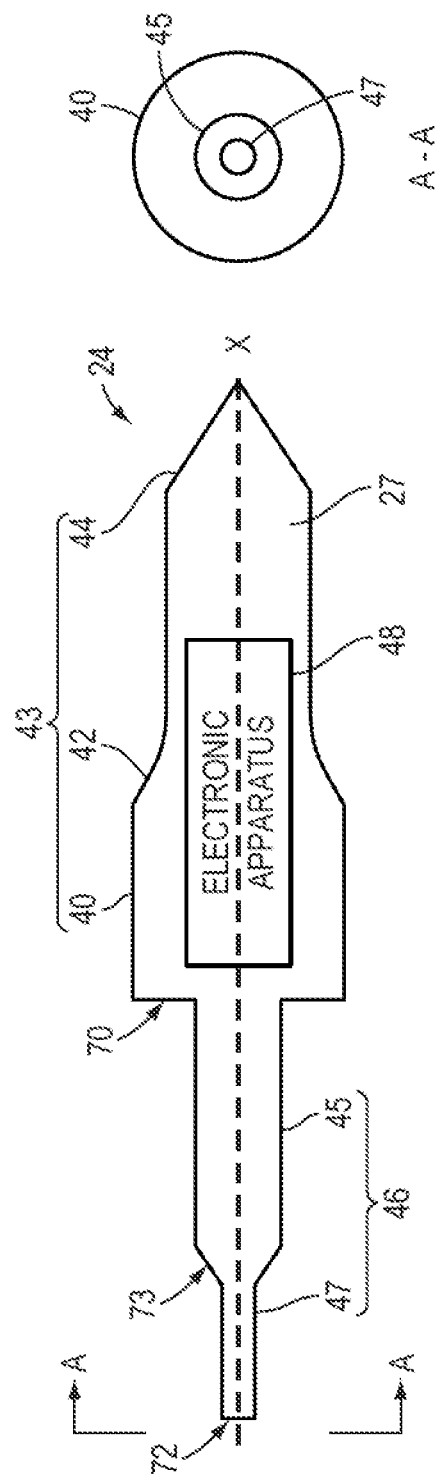
FIGS. 4A and 4B illustrate an arrow tip in accordance with one embodiment of the invention.

Referring now to FIGS. 4A and 4B, an arrow tip 24 equipped with an electronic apparatus 48 is illustrated. As mentioned above, embodiments of the invention may be employed with tips (e.g., the tip 24) of various styles and types. According to the embodiment shown in FIG. 2, the tip 24 is a field point such as those commonly employed in target shooting. In a further embodiment, the tip 24 is configured to comply with applicable standards by any of the Archery Manufacturers Organization (AMO), the Archery Trade Association (ATA) and the ASTM such as those published in AMO Standards Committee "Field Publication FP-3" (2000).

According to one embodiment, the tip 24 includes a housing 27 sized and configured to house the electronic apparatus 48. The housing 27 may fully enclose the electronic apparatus 48. In some embodiments, the housing 27 may seal the electronic apparatus 48 from the surrounding atmosphere, at least to some degree and perhaps fully. For example, in one embodiment, the housing 27 provides a water resistant seal for the electronic apparatus 48. In a version of this embodiment, the housing 27 provides a hermetic seal for the electronic apparatus 48.

In one embodiment, one or more components of the electronic apparatus such as an electrical contact or an antenna are exposed on the surface of the housing 27.

In accordance with one embodiment, the housing 27 includes the regions of the tip 24 (for example, the regions of the body 43 and the shaft 46) where the electronic apparatus 48 is not located. In the illustrated embodiment, for example, the housing 27 is represented by all the areas of the body 43 and the shaft 46 where the electronic apparatus is not represented. In other embodiments, all or a portion of the body 43 may provide the housing 27. Thus, in some embodiments, the housing 27 includes the physical structure required to secure the tip 24 including the electronic apparatus 48 to the arrow. As mentioned above, these features may include a threaded shaft, a hollow region or various other structures.

In various embodiments, the housing 27 is manufactured from material selected to facilitate operation of the electronic apparatus 48. For example, the housing may be manufactured from steel, aluminum, titanium, other metal alloys, plastic, ceramic, rubber, or any combination of the preceding or other material. In accordance with one embodiment, the electronic apparatus 48 includes an antenna and the housing 27 is manufactured to provide relatively low levels of energy-absorption at the transmission frequency employed by the antenna. In a further embodiment, only portions of the housing 27 provide a relatively low level of energy-absorption at the transmission frequency. In accordance with some embodiments, only some portions of the housing are manufactured based on the RF energy-absorption properties of the material while other regions of the housing 27 are manufactured in view of other characteristics. In one embodiment, only the regions that are adjacent the antenna may be selected based on the RF energy-absorption properties of the material. According to some embodiments, the material of the housing 27 (or regions thereof) may also be selected based on any of the size, mass and desired weight distribution of tip 24.

In accordance with one embodiment, the material of the housing 27 is selected base on the mass of the electronic apparatus 48. That is, the material of the housing 27 may be selected such that the total mass of the arrow tip equals a mass of a commercially-available arrow-tip of the same type (e.g., field point, broadhead, etc.) that does not include the electronic apparatus 48. For example, the total mass of the arrow tip 24 including the electronic apparatus 24 may be any of 75 grains, 90, grains, 100 grains, 125 grains and 140 grains.

In one embodiment, the electronic apparatus 48 (or components thereof) is encapsulated in the housing 27. For example, the tip 24 may be manufactured by filling voids in a mold that includes the electronic apparatus 48.

In accordance with one embodiment, a first surface 70 may extend from the shoulder 40 to the first region 45. In one embodiment, the first surface extends in a radially inward direction from the shoulder 40 to the first region 45 relative to a longitudinal axis X of the tip 24. In a further embodiment, the tip 24 may also include a second surface 72 located at the proximate end of the arrow tip 24. In one embodiment, the second surface 72 extends substantially perpendicular to the longitudinal axis X of the arrow tip 24. In another embodiment, a third surface 73 extends from the first region 45 to the second region 47. In the illustrated embodiment, the third surface 73 is a tapered surface, however, it need not be tapered. That is, any of the surfaces 70, 72 and 73 may include a shape that is flat, tapered, concave or convex provided the shape is suitable to mate with a corresponding surface (e.g., a surface of the adapter 30). Further, the shape of the surfaces need not be uniform. That is, the surface may include undulations, valleys, ridges and other non-uniformities. According to illustrated embodiment, the longitudinal axis X is centrally located within the tip 24.

The electronic apparatus 48 or portions of the apparatus may be located anywhere within the tip 24 that allows the apparatus 48 to perform the intended function or functions of the apparatus 48. Some factors that may be considered when locating the electronic apparatus 48 include the size (e.g., dimensions) of the electronic apparatus 48, the overall weight of the electronic apparatus 48, the weight distribution of the apparatus, the type of communication interface (or interfaces) employed with the apparatus and any required external access to the apparatus or portions of the device. For example, the electronic apparatus 48 may be configured with a rechargeable power source (e.g., power source 54). Accordingly, one or more embodiments may provide an electrical connection (e.g., the electrical connection 64) that is externally accessible to the tip 24.

Because arrow tips 24 are often removable, in one embodiment, the electrical connection 64 is included in a surface that is only accessible when the tip 24 is removed from the arrow 20. However, other alternative structures may be employed to provide the electrical connection. For example, one or more regions of the shoulder 40, the tapered region 42 and/or the point 44 may provide the electrical connection. In various embodiments where an electrical connection is provided by a portion of the tip 24 that is accessible with the tip attached to the arrow 20, recharging may be accomplished without removing the tip 24 from the arrow 20.

In accordance with one embodiment, the electrical connection is a "multi-conductor" connection that may be provided by a plurality of contacts. For example, the electronic apparatus 48 may include a DC circuit having a positive connection and a negative connection. Thus, the positive and negative connections may be provided by a first contact and a second contact, respectively. In one embodiment, these contacts may be located in separate surfaces, e.g., 70, 72, 73. Alternatively, a single surface (e.g., 70, 72, 73) may include two contact surfaces that provide an electrical connection for the positive DC and negative DC, respectively. In a version of this embodiment, the electrical connections are disposed on the same surface and are separated from one another by insulating material.

Further, the contact surface need not be provided on an externally accessible surface. That is, the tip 24 may include one or more recesses that provide a power receptacle suitable for receiving a connector coupled to the recharging circuitry. Such structure is sometimes employed in charging circuitry for cordless hand tools and handheld electronic devices such as cell phones and the like.

In some embodiments, one or more components of the electronic apparatus 48 are externally accessible. For example, the electronic apparatus 48 can include a power source 54 such as a battery, e.g., a coin cell battery, which is periodically replaced or removed for recharging. In this embodiment, the battery is integrated in the arrow tip 24 in a manner that allows it to be removed and reinstalled/replaced. In one embodiment, the power source 54 is removably located in the shaft 46 so that it is securely received when the tip 24 is installed in the arrow 20 and easily removed when the tip 24 is removed. In other embodiments, the power source 54 is removably located in the body 43.

In some embodiments, the electronic apparatus 48 includes a switch (e.g., the switch 56) that activates the electronic apparatus 48 when it is turned on. The switch 56 may, for example, include inertially-operated switches that activate when the arrow is shot, limit switches that are activated when the tip 24 is connected to the arrow 20 or manually operated switches. As is described in more detail herein, in a further embodiment, corresponding contacts located in the tip 24 and the shaft 22 or adapter 30, respectively, engage when the tip 24 is connected to (e.g., fully engaged with) the shaft 22 or adapter 30 to complete a circuit that activates the apparatus 48. In one embodiment, the contacts complete a power circuit that "powers-up" the electronic circuitry 50 so that it apparatus begins operating.

Thus, in one embodiment, a switch need not be employed. Instead, all or a portion of the electronic circuitry of the apparatus 48 (e.g., the circuitry 50) may be connected to the power source by the act of connecting the arrow tip 24 to the shaft 22. Further, in some embodiments, the contacts of a switch integral to the electronic apparatus 48 (or alternatively, in the shaft 22 or elsewhere in the arrow 20) may be closed when the tip 24 is attached to the arrow.

In embodiments where a manually operated switch (e.g., the switch 56) is employed, the switch 56 may be located so that it is externally accessible. Such switches may include slide switches (including rotary slide switches), DIP switches, pushbutton switches or any other structure that allows a user to activate the electronic apparatus 48 at the time of use. Accordingly, the switch may be located in any of the shoulder 40, tapered region 42, point 44 or shaft 46. In one embodiment, the switch is located in one of the shoulder 40, the tapered region 42 and the point 44 where it is externally accessible with the tip 24 installed as part of the arrow 20.

Similarly, elements of the communication interface 52 may also be externally accessible. For example, the communication port 60 may be located in either of the body 43 or the shaft 46. That is, a communication port such as a USB port or other type of communication port may be located so that the electronic apparatus 48 can be physically connected to an external device (e.g., a computing device) and communicate information (e.g., data) from the electronic apparatus 48 to the external device. In one embodiment, the communication port 60 is configured to allow the electronic apparatus 48 to be plugged into a communication cable connected to the external device. In another embodiment, the communication port 60 is located in the body to allow the apparatus 48 to be connected to the remote device while the tip 24 is installed as part of the arrow 20. In accordance with one embodiment, the communication port 60 is configured so that it is connected to the remote device by plugging the tip 24 into a communication port integral to the remote device after the tip 24 is removed from the arrow 22.

According to some embodiments, the arrow tip 24 includes the communication port 60 in the region of the second surface 72, that is, at a proximate end of the shaft 46. For example, the arrow tip 24 may include a port having a recess coaxially located about the axis X in the proximate end of the shaft 46.

As will be apparent to those of ordinary skill in the art, although the apparatus 48 is illustrated as a self-contained module, various components of the apparatus 48 may be distributed among the different sections of the tip 24. In these embodiments, electronic/electrical conductors may interconnect the various components such as the power source 54, the communication interface 52 and the elements of the electronic circuitry 50.

In accordance with any of these embodiment, the electrical connection includes a conducting material such as copper, aluminum, gold, silver or one of the various suitable alloys of these or other materials that are known to those of skill in the art.

In accordance with one embodiment, the electronic apparatus 48 includes an accelerometer. Versions of this embodiment, for example, can be employed to determine the velocity of the arrow 20 in which the apparatus 48 is employed. That is, the velocity of the arrow in a direction of a longitudinal axis of the arrow. In a further embodiment, other flight characteristics of the arrow may be determined such as any of the pitch of the arrow, the yaw of the arrow, the roll of the arrow and the energy retained in the arrow as it travels downrange (e.g., the kinetic energy). In some embodiments, the preceding data may be determined on an average basis. In some other embodiments, the preceding data may be determined on an instantaneous basis. Further, the accelerometer may provide the data on a substantially continuous basis during the flight of the arrow. In further embodiments, the electronic apparatus 48 can be employed in a system that can determine any one of or any combination of velocity (including instantaneous velocity) and others of the flight characteristics on a substantially real-time basis.

In some embodiments described further below, the electronic apparatus 48 including an accelerometer may be employed in a process of tuning an archery system, for example, making adjustments in the archery equipment and/or the technique of an archer in view of data provided by the electronic apparatus 48. In various embodiments, the tuning process results in increased stability of the arrow in flight following one or more adjustments to the archery equipment and/or the technique of the archer. For example, various flight characteristics collected during a single shot or a plurality of shots using an arrow equipped with the accelerometer may provide an archer with information indicative of how well the archery equipment is tuned. Subsequent adjustment(s) may be evaluated based on flight characteristics determined following the adjustment(s).

Figure 5:
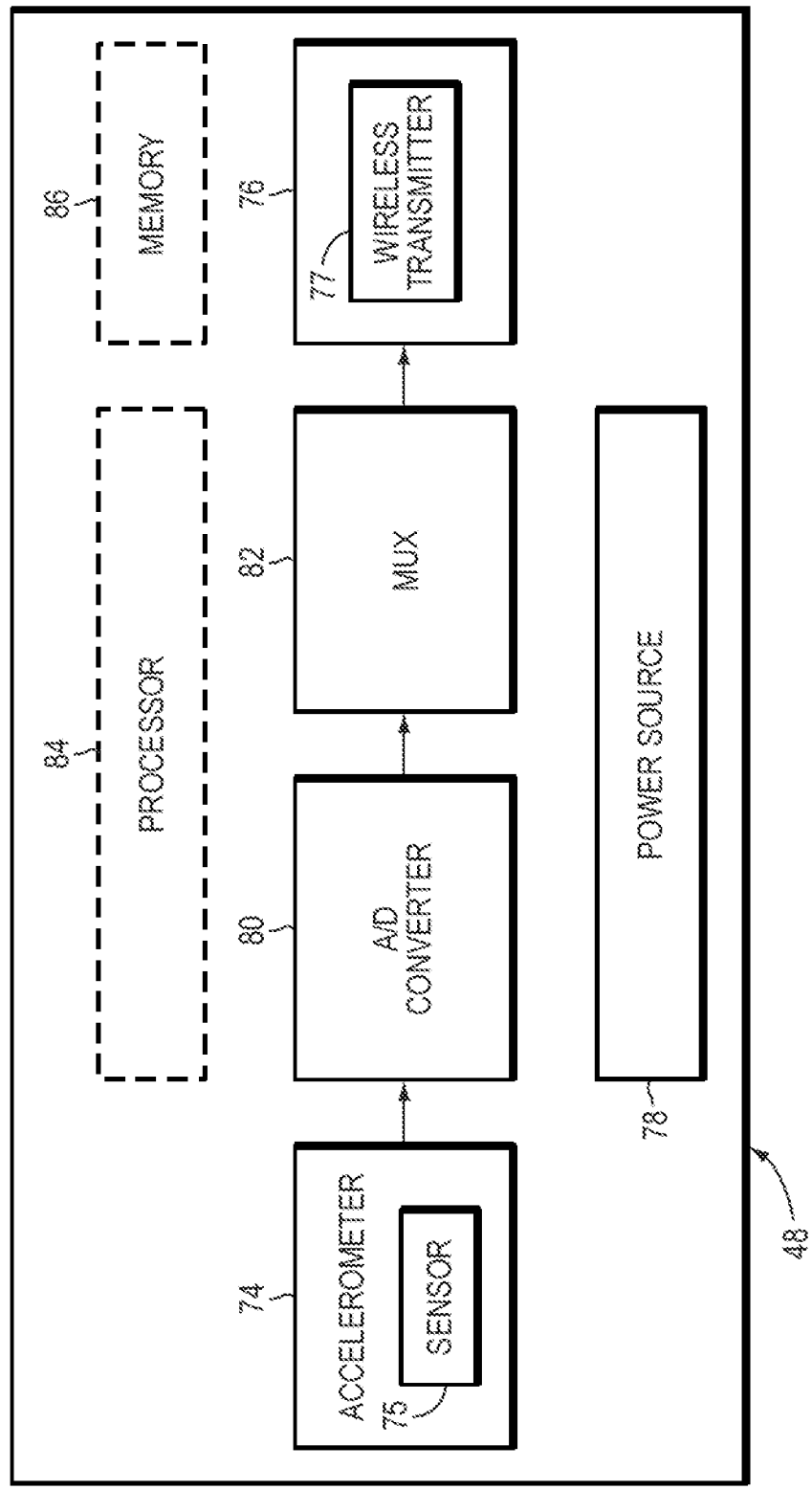
FIG. 5 illustrates an electronic device in accordance with another embodiment of the invention.

Referring now to FIG. 5, in accordance with one embodiment, the electronic apparatus 48 includes an accelerometer 74 including a sensor 75. The electronic apparatus 48 may also include a communication link 76 and a power source 78. In a further embodiment, the apparatus 48 may include an analog to digital converter ("ADC") 80 and a mutliplexer 82 ("MUX"). Optionally, in accordance with some embodiments, the electronic apparatus 48 includes a processor 84 and a memory 86.

In accordance with various embodiments, the accelerometer 74 may employ a MEMS accelerometer in a form factor that allows the electronic apparatus 48 to be included in the arrow tip 24. In versions of this embodiment, the accelerometer 74 may include any of the following types of sensor-types: capacitive, piezoresistive, electromagnetic, piezoelectric, ferroelectric, optical and tunneling. The accelerometer 74 may include one or a plurality of sensors 75. In further embodiments, the accelerometer 74 may include either or both of a linear accelerometer or an angular accelerometer. Further, in some embodiments, the accelerometer may include a plurality of either or both of linear accelerometers or angular accelerometers. The accelerometer 74 may be a single axis accelerometer or a multi-axis accelerometer having two or more sensors. Where a multi-axis accelerometer is employed, the accelerometer 74 may include two or more sensors 75 each configured to measure axial acceleration. In another embodiment, a plurality of separate accelerometers each including at least one sensor 75 are employed. In various embodiments, the accelerometers may be oriented in the arrow tip 24 such that any of acceleration along the longitudinal axis of the arrow or acceleration indicative of any of a pitch of the arrow, a yaw of the arrow, and a roll of the arrow may be determined.

Where an angular accelerometer is employed in the apparatus 48, the accelerometer 74 may include a coriolis accelerometer. Further, in some embodiments, the angular accelerometer may be located in the tip 24 to sense rotation about an axis of a linear accelerometer also included in the tip 24.

The accelerometer 74 may provide an analog output, a digital output or a pulse modulated output. In some embodiments, the accelerometer output includes a voltage output that is ratiometric relative to the supply voltage from the power supply 78. In embodiments where the accelerometer 74 includes multiple sensors 75, the accelerometer 74 may include a plurality of outputs where each output corresponds to one of the sensors 75. In accordance with one embodiment, the accelerometer signal conditions one or more of the outputs.

In various embodiments, the accelerometer includes other components in addition to the sensor 75. For example, the accelerometer generally can include amplifiers, filters, timing generators, etc. In accordance with one embodiment, the accelerometer 74 includes (in addition to the sensor 75) any one or a combination of the following: an amplifier, a filter and a demodulator. In some embodiments, the accelerometer including the sensor and any other components are included in a single monolithic integrated circuit. According to one embodiment, a separate amplifier is employed with each sensor. In a further embodiment, the sensor 75, the amplifier, the filter and the amplifier(s) are included in a single monolithic integrated circuit. In a version of this embodiment, the accelerometer is a model ADXL193 manufactured by Analog Devices. In another version of this embodiment, the accelerometer is a model ADXL78 manufactured by Analog Devices. In accordance with one embodiment, the accelerometer includes the sensor 75, one or more output amplifiers and an AC amplifier. In a version of this embodiment, the accelerometer is a model ADXL320 manufactured by Analog Devices.

Some embodiments of the electronic apparatus 48 may employ circuitry (e.g., signal processing circuitry either integral to or external from the accelerometer 74) to receive an input from the sensor 75 and generate a subsequent signal for processing and/or transmission. In various embodiments, this subsequent signal is representative of the output of the sensor 75. For example, the circuitry may convert a change in a first parameter (e.g., capacitance) into a corresponding value of voltage and/or current.

In accordance with some embodiments, the electronic apparatus 48 is configured to withstand the forces to which an arrow is subject including the forces to which an arrow is subject with modem archery equipment (e.g., compound bows and crossbows). Modem compound bows allow archers to shoot arrows at velocities of greater than 300 ft/sec. In general, modern arrows complete with the arrow tip may have a mass of anywhere from 250 grains to 700 grains. Given the preceding facts a 400 grain arrow with a maximum velocity of 320 ft./sec may be subject to an average force of 27.44 N in an example where the arrow accelerates for 0.1 seconds before leaving the bow (i.e., disconnecting from the bow string following the release by the archer). Because the electronic apparatus 48 may include shock-sensitive components, in some embodiments, the housing 27 and/or the apparatus 48 are configured to withstand being repeatedly subject to average forces of from 1.6 to 45 N and impulse forces of from 0.16 to 4.5 N s.

In one embodiment, the housing 27 includes a material with viscoelastic properties that reduce the shock felt by portions of the electronic apparatus 48 included therein. That is, in some embodiments, the viscoelastic material is effective in reducing the shock both when the arrow is shot from the bow and when the arrow strikes the target. In one embodiment, the viscoelastic material is molded around portions of the electronic apparatus 48 (for example, those portions located in the body of the tip) to form an arrow tip having a desired shape.

Further, the relatively rapid acceleration that occurs when an arrow is shot and the relatively rapid deceleration that occurs when arrow strikes a target subject the arrow to a substantial g-force. Again referring to a 400 grain arrow with a maximum velocity of 320 ft./sec, the electronic apparatus may be accelerated at approximately 980 m/s$^2$ when the arrow is shot from the bow (again assuming that the arrow maintains contact with the bow string for 0.1 seconds when the arrow is released from the bow). Accordingly, in some embodiments, the range of the accelerometer 74 can be a minimum of ±100 g. Further, the accelerometer may measure static acceleration, dynamic acceleration (e.g., linear and/or angular) or both static and dynamic acceleration.

In some embodiments, the electronic apparatus 48 includes a plurality of accelerometers. In accordance with one embodiment, each of the accelerometers includes one or more sensors.

In various embodiments, the communication link 76 may include a wireless transmitter 77. For example, in accordance with one embodiment, the transmitter 77 operates in one of the ISM frequency bands, for example, any of the 900 MHz band, the 1.8 GHz band, the 2.4 GHz band or the 5.8 GHz band. In other embodiments, the transmitter 77 employs one of the protocols standarized under 802.11 and a corresponding frequency band. For example, in various embodiments, any of the 802.11a, 802.11b, 802.11g and 802.11n protocols may be employed at frequencies such as 2.4 GHz, 2.4-2.5 GHz, 5 GHz and 5.15-5.875 GHz. In addition, other lower frequency transmission bands may be employed by the wireless transmitter 77, for example, transmission at less than 500 MHz. In various embodiments, the preceding frequency bands are approximate and the actual frequency of such bands may be described as substantially equal to one of the above values.

Some embodiments may employ a Bluetooth communication protocol such as Bluetooth class 1 or Bluetooth class 2. Accordingly, some of the embodiments described above may employ a relatively low power transmission of, for example, less than 2.5 mW, approximately equal to 2.5 mW, approximately equal to 100 mW and the like provided that the power is sufficient to transmit the signal to a local receiver.

One feature of most archery applications is that modem archers generally direct their arrow at a target that is located no more than approximately 70-90 yards distant. Thus, the arrow generally travels no more than approximately 90 yards provided that it strikes the intended target. Where a receiver is located adjacent an archer, the signal will be transmitted a maximum of approximately 90 yards, i.e., the downrange distance of the target from the archer. The maximum required transmission distance may be further reduced by locating the receiver at a point that is downrange of the archer, for example, at a point equidistant between the archer and the target. Accordingly, where a target is 90 yards distant from the archer, a receiver may be located 45 yards downrange and the maximum required transmission distance is approximately 45 yards. In addition, archery target ranges generally provide a clear line-of-sight between the archery and the target. Accordingly, embodiments of the invention are employed where a clear line-of-sight is available for the flight path of the arrow from the archer to the target. Consequently, wireless communication from the electronic apparatus 48 to a receiver located at the archery range is facilitated in accordance with some embodiments.

In some embodiments, the limited flight distance of an arrow and/or clear line-of-sight for along the path of signal transmission allows the communication link 76 to operate at relatively low power levels. The preceding approach may also result in the electronic apparatus 48 having a smaller form factor that makes it suitable for inclusion in the tip 24 of the arrow 20. In some embodiments, the communication link 76 transmits at higher power levels that allow a signal to be clearly transmitted from the electronic apparatus 48 over a much greater distance than 90 yards. In one embodiment, the electronic apparatus 48 maintains a form factor suitable for inclusion in an arrow despite being capable of greater transmission distances. Further, the reduced power requirements of the electronic apparatus 48 can in some embodiments allow for a reduction in a size and/or a capacity of the power source 78. This also facilitates a form factor of the electronic apparatus 48 such that it that can be more easily employed as a part of an arrow.

In accordance with some embodiments, a first portion of the communication link 76 is included in the arrow tip 24 and a second portion of the communication link is included elsewhere in the arrow (for example, in the shaft or on the exterior of the shaft of the arrow).

In addition to the preceding facts, the electronic apparatus 48 and the power supply 78 in particular can be reduced in size and/or capacity because of the limited operating time required of the electronic apparatus 48 in some embodiments. That is, in accordance with one embodiment, the electronic apparatus 48 is activated (e.g., turned on) just prior to the arrow being placed in the bow when the shot is taken. Further, the electronic apparatus 48 can then be turned off by the user when the arrow is retrieved from the target. The electronic apparatus 48 may subsequently be reactivated just prior to the next time a shot is taken. The subsequent shot may be immediately subsequent or may occur following a substantial delay. In many instances, the operating time of the electronic apparatus 48 from the time the device is turned on until the time the arrow including the device is retrieved from the target may be a minute or less. In these circumstances the life of the power source 78 can readily be conserved. Accordingly, a smaller power source may be more effective in embodiments of the electronic apparatus 48 than the same capacity power source would have been in prior devices. The immediately preceding approach may be further facilitated by employing embodiments of the electronic apparatus 48 that are easily turned on and off by the user.

Accordingly, in some embodiments, the electronic apparatus 48 is configured to operate with a power source having a nominal output voltage of 1.5 VDC. In a further embodiment, the accelerometer 74 is included in a single monolithic integrated circuit that is configured to operate using a nominal voltage of 1.5 VDC (e.g., is configured to operate with a power source that provides a nominal output of 1.5 VDC).

In accordance with one embodiment, the communication link 76 includes an antenna for transmitting RF signals from the electronic apparatus 48. In various embodiments, these signals include data corresponding to the output of one or more sensors 75 and/or accelerometers included in the apparatus 48 (e.g., "acceleration signals"). In one embodiment, a 50 ohm antenna is employed. Here too, some embodiments include an antenna having a suitable form factor (for example, for inclusion in the arrow tip 24) as a result of a configuration that is employed for limited transmission distances where a clear line-of-sight is available. This is in contrast to prior devices, for example, tracking devices that required that signals be transmitted over much greater transmission distances where signal interference was also likely.

In accordance with one embodiment, the acceleration signals provide data (which is an example of flight data) concerning one or more flight characteristics of the arrow in flight. For example, one or more sensors included in the accelerometer may provide data that can be used to determine any one of or any combination of the velocity of the arrow, the pitch of the arrow, the yaw of the arrow, the roll of the arrow and the kinetic energy of the arrow. For example, velocity can be determined by integrating acceleration. As another example, kinetic energy can be determined where the acceleration of the arrow is known and the mass of the arrow is known. The value of kinetic energy can be of great importance to an archer testing bow hunting equipment because it provides information concerning the ability of the arrow to penetrate a target at some point downrange. In some embodiments, the kinetic energy is derived from a known mass of the arrow including the arrow tip 24 (for example, as supplied by the user) and the acceleration as supplied by the electronic apparatus 48.

Further, although an accelerometer 74 is illustrated in FIG. 5, the electronic apparatus 48 may include other devices and sensors. In one embodiment, the electronic apparatus 48 includes a gyroscope. In a further embodiment, the electronic apparatus 48 includes a plurality of gyroscopes. The output of the gyroscope or other devices/sensors may be connected in a similar fashion as the accelerometer 74. That is, in one embodiment, the gyroscope output can be supplied to an ADC and/or MUX and then transmitted via the communication link 76.

In some embodiments, the communication link 76 includes a receiver (e.g., a transceiver) so that the electronic apparatus 48 can both transmit data and receive data.

According to a further embodiment, the communication link 76 transmits optical signals (e.g., optically encoded signals) and the wireless transmitter 77 is an optical signal source.

In yet another embodiment, the communication link 76 may include a port for connection to an external device via a cable using any number of standard communication methods including, but not limited to, standard parallel port communication, serial port communication, Universal Serial Bus (USB), etc. In a version of this embodiment, a USB port is located in the tip 24. For example, the USB port may be located such that a cable connector is engaged with the port by pressing the connector radially inward into the port relative to the longitudinal axis of the tip 24. In some embodiments, where the communication link 76 includes a port in accordance with the preceding embodiment, the communication link can also include a wireless transmitter.

In accordance with the preceding, it should be appreciated that the present invention is not limited to a particular type of communication link 76 as a variety of types of communication methods may suitably be used. Further, as used herein the term "communication link" refers to a link that is capable of transmitting information in signals using a pre-determined communication protocol where the information may be interpreted by a receiver configured to process a signal transmitted in the pre-determined communication protocol.

In one embodiment, the power source 78 is a battery. In a version of this embodiment, the power source 78 is a lithium coin cell, e.g., a rechargeable power source. The power source 78 may be any type of power source suitable for powering electronic circuitry in a form factor suitable for location in an arrow or part thereof, e.g., in the tip 24. As described above, in various embodiments, the power source 78 may be a removeable power source that can be removed and/or replaced. Further, in accordance with one embodiment, the power source 78 is included in the arrow tip 24 while in alternate embodiments, the power source 78 is located elsewhere in the arrow, for example, in the shaft 22. Further, the power supply 78 may include voltage-conditioning circuitry including voltage regulation circuitry and/or one or more filters. In accordance with one embodiment, the power source 78 provides power at approximately 5 VDC (e.g., a nominal 5 VDC±0.25 VDC) while in another embodiment the power source provides power at approximately 3 VDC (e.g., a nominal 3 VDC±0.25 VDC).

In accordance with one embodiment, the power source includes a plurality of coin cell batteries. According to one embodiment, the plurality of batteries are coupled in a series configuration that provides an increased output voltage of the powers source 78, e.g., increased relative to an output voltage of any one of the batteries alone. In accordance with another embodiment, the plurality of batteries are configured in a parallel configuration to increase the available power of the power source 78 without increasing the output voltage of the power source 78 beyond the output voltage of a single battery.

In various embodiments, an output of the power source 78 can be coupled to any of the accelerometer 74, the ADC 80, the MUX 82, the communication link 76, the processor 84, the memory 86, any combination of the preceding or any of the preceding in combination with other components included in the electronic apparatus 48. In accordance with one embodiment, the output of the power source is coupled to each of the accelerometer 74, the ADC 80, the MUX 82, the communication link 76, the processor 84 and the memory 86.

In accordance with one embodiment, an output of the accelerometer 74 is provided to the ADC 80 which converts an analog output signal from the accelerometer 74 to a digital signal that can be transmitted by the communication link 76. In some embodiments, the MUX 82 is not employed and the output of the ADC 80 is communicated to the communication link 76 for transmission, for example, where a single sensor 75 is employed with the apparatus 48. In other embodiments, the output of the ADC 80 is communicated to an input of the MUX 82 which can provide an output corresponding to a plurality of inputs on a single channel. For example, in some embodiments, the electronic apparatus 48 includes a plurality of sensors 75 and signals corresponding to at least two of the sensors are provided to the ADC 80 which provides an output signal corresponding to the plurality of inputs. In this example, the ADC may switch between inputs at a pre-defined rate to continuously monitor acceleration signals provided from a plurality of sensors.

In some embodiments, a plurality of ADCs 80 are employed where each ADC receives a different sensor output signal, for example, a first ADC receives a signal from a sensor (e.g., the sensor 75) oriented in a first axis and a second ADC receives a signal from a sensor oriented in a second axis. In accordance with other embodiments, a single ADC is employed with a plurality of sensors 75, e.g., a single accelerometer having a plurality of sensors or a plurality of accelerometers each with one or more sensors. In accordance with one embodiment, the signal provided from the accelerometer is first communicated to the MUX 82 and then communicated to the ADC 80. That is, the accelerometer (or accelerometers) provide a plurality of output signals that are received by the MUX 82 and converted to a single channel output. The single channel output is then communicated to the input of an ADC 80. In accordance with this embodiment, the output of the ADC is communicated to the input of the communication link 76.

In accordance with one embodiment, the MUX includes a demultiplexer. In another embodiment, the MUX is replaced with other circuitry capable of converting parallel signals to serial signals.

In various embodiments, the electronic apparatus includes the processor 84 and the memory 86 along with the various components illustrated in FIG. 5. In accordance with the illustrated embodiment, the memory 86 is external to the processor 84. According to various embodiments, the processor 84 is coupled to the memory 86 and may also be connected to at least some of the other components of the electronic apparatus 48. In accordance with a further embodiment, the memory 86 is included as an integral component of the processor 84. In some embodiments, an operation of the electronic apparatus 48 may be implemented under the control of the processor 84. In accordance with some embodiments, the processor 84 is included in a microcontroller.

In some embodiments, the data provided by the accelerometer is stored in the memory 86 from which it can be later downloaded. For example, where the communication link 76 includes a port, flight data may be collected during a flight of the arrow and be stored in the memory 86. The communication port can then be coupled to an external device and the flight data can be downloaded from the memory 86 to the external device. According to one embodiment, the arrow tip is removed from the arrow before the information is downloaded.

Figure 6:
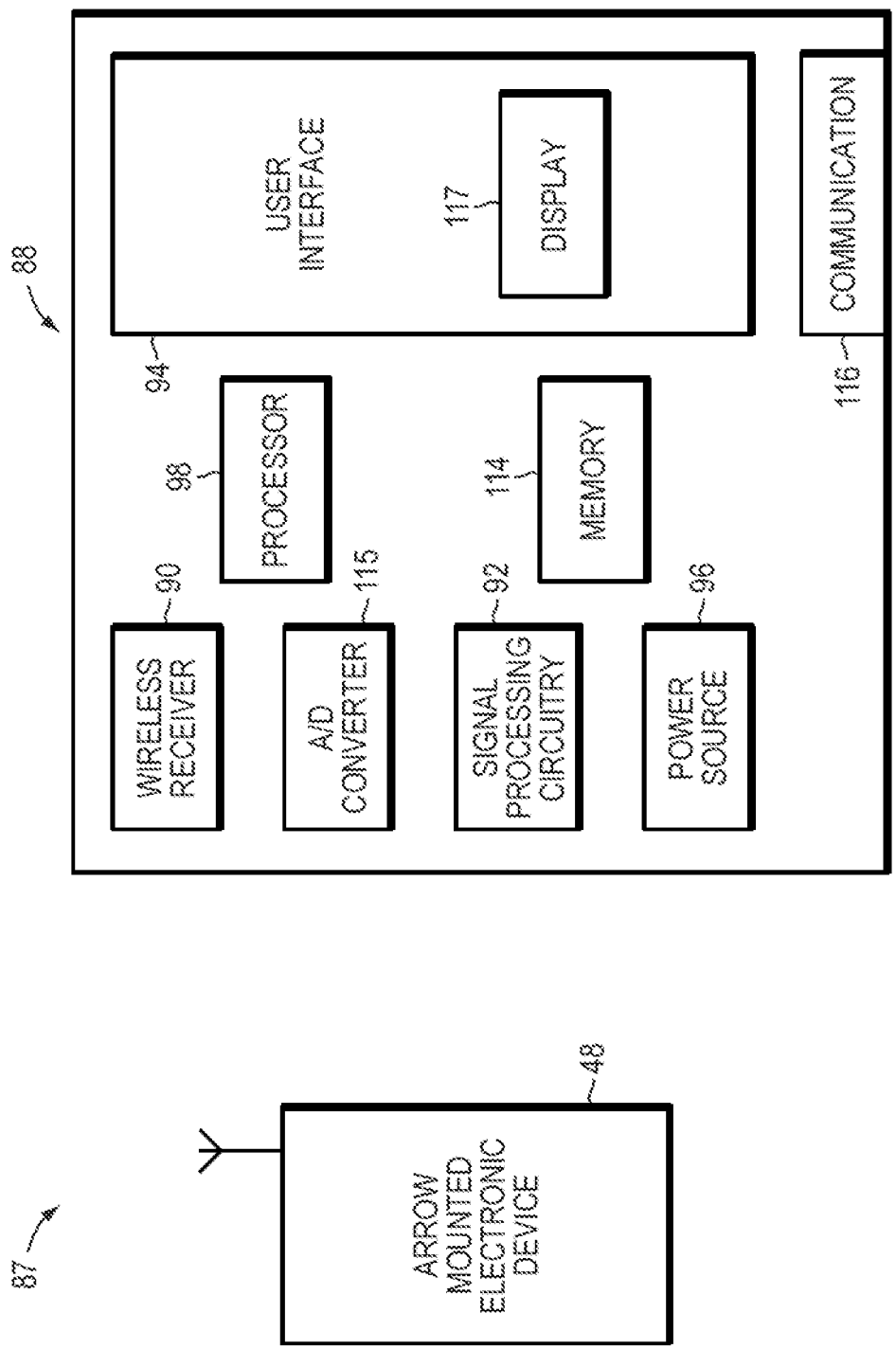
FIG. 6 illustrates the orientation of axes relevant to arrow flight in accordance with one embodiment of the invention.

In accordance with one embodiment, the electronic apparatus 48 is employed with a receiving module. FIG. 6 illustrates an embodiment of a system 87 where the electronic apparatus 48 is employed with a base station 88 that includes a wireless receiver 90, signal processing circuitry 92 and a user interface 94. The base station can also include a power source 96, a processor 98, memory 114, an ADC 115 and a communication port 116. In one embodiment, the user interface 94 includes a display 117.

In accordance with various embodiments, the base station 88 is a computing device that includes one or more programs stored in the memory 114 or on some other computer readable medium. In these embodiments, the program may include instructions that when executed on the processor 98 perform various acts involved in any one of or any combination of: receiving a signal from the apparatus 48; decoding the signal from the apparatus to generate data corresponding to the acceleration signals provided by the apparatus and the sensor(s) 75; various other signal processing functions performed on the data corresponding to the acceleration signals; storing the data corresponding to the acceleration signals in memory; and displaying one or more results of the signal processing to a user. In one embodiment, the data corresponding to the acceleration signals is employed by the base station 88 to determine flight characteristics concerning the flight of the arrow. The flight characteristics may include the velocity of the arrow 20 that the electronic apparatus 48 is employed with, a pitch of the arrow, a roll of the arrow, a yaw of the arrow, a kinetic energy of the arrow and a flight path of the arrow. Further, various embodiments may display the results of one or more of the preceding determinations in the display 117. The display can include data in any format suitable for display on a computer screen such as tables, graphs and other plots. In various embodiments, this data results from one or more acts of statistical processing, for example, to determine instantaneous values, minimums, maximums, averages and/or other statistical parameters. The data may be displayed as discrete values and/or as one or more continuous functions. Further, in some embodiments, the data may be displayed in substantially real time.

In accordance with one embodiment, the system 87 (e.g., the base station 88) can determine values that are at least in part determined using the information provided by the electronic apparatus 48 included in the arrow during flight. These values may be of particular interest to a user (e.g., an archer), for example, some embodiments can generate and display any of the velocity of the arrow, the kinetic energy of the arrow, the movement or the stability of the arrow about one or more axes of the arrow, etc. In accordance with some embodiments, the electronic apparatus 48 provides data for a plurality of points along the flight path of the arrow. In a further embodiment, the electronic apparatus 48 provides data for points along substantially the entire flight path of the arrow. For example, the electronic apparatus 48 can include a sampling frequency such that acceleration data is periodically provided at the sampling frequency. Thus, some embodiments of the electronic apparatus 48 can provide data that can be used by a system to determine of any of the instantaneous velocity, kinetic energy, angle of inclination, etc. at a plurality points along the flight path.

It should be appreciated that the base station 88 may be any of a variety of computing devices. Further, the term "base station" is not intended to require that the base station is a non-portable device. Instead, in some embodiments the base station may be a portable computing device. For example, the base station may be a personal computer, a laptop computer, a hand held device such as a PDA or cellphone, or any other computing device capable of executing a program. Accordingly, it should be appreciated that the present invention is not limited to a particular type of computing device.

Further, in one embodiment, the user interface includes an input device. In various embodiments, the input device may be any of a number of devices capable of receiving information, including, but not limited to, a touchpad screen, a keyboard or keypad, and interface software for receiving input from a mouse, pointer, etc.

In accordance with one embodiment, the wireless receiver 90 includes a transmitter. That is, the wireless receiver 90 is a transceiver capable of transmitting data to another computing device and/or the electronic apparatus 48.

In accordance with one embodiment, the signal processing circuitry 92 includes the ADC 115. In other embodiments, the ADC 115 is included in circuitry that is separate from the signal processing circuitry 92.

Figure 7:
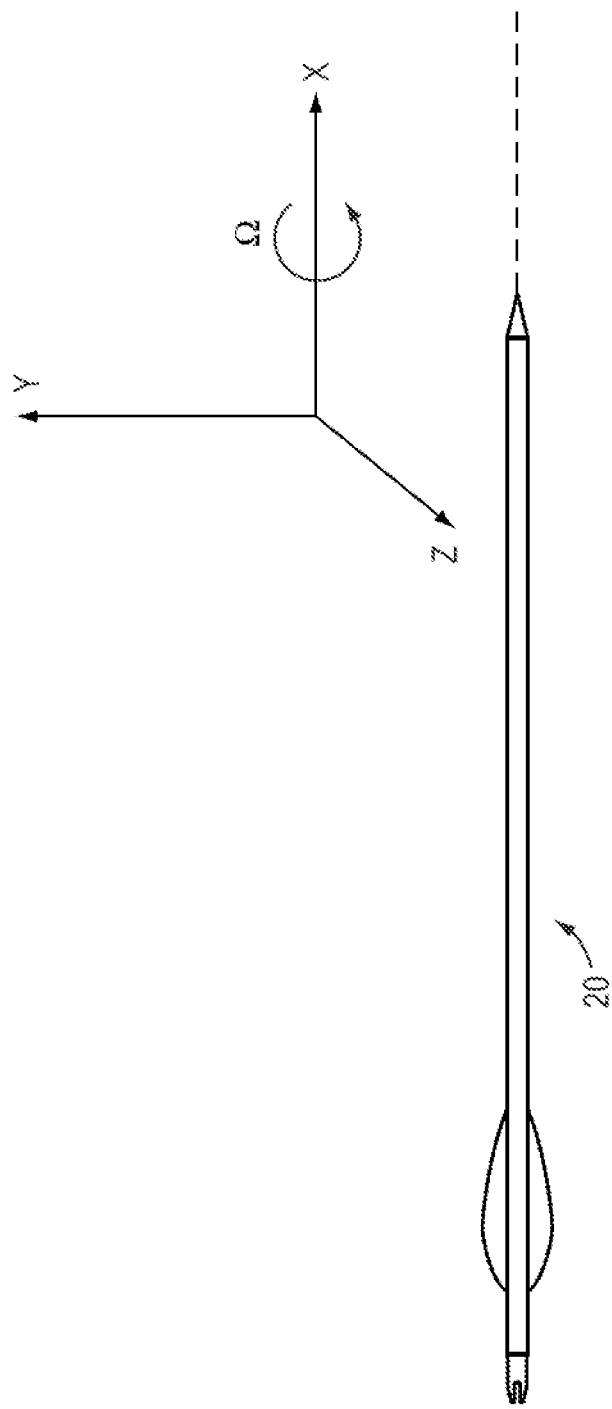
FIG. 7; illustrates a coordinate system in accordance with one embodiment of the invention.

Referring to FIG. 7, in accordance with one embodiment, a set of coordinates relative to an arrow 20 equipped with an electronic apparatus 48 is illustrated. In this example, a positive x-axis is parallel with the longitudinal axis of the arrow 20 (e.g., coincident to the longitudinal axis) and a positive y-axis and positive z-axis extend perpendicular to the x-axis as shown. In one embodiment, the arrow may roll in the direction Ω about the x-axis during flight. The flight characteristics of the arrow 20 may also include pitch in the plane defined by combination of the x-axis and the y-axis and yaw about the y-axis.

In various embodiments, the electronic apparatus 48 may include sensors (e.g., the sensor 75) configured to sense the flight characteristics and to provide a corresponding signal. The sensors may include accelerometers, gyroscopes, a combination of the preceding and/or other sensors. Further, signal processing circuitry included in the electronic apparatus 48 may sample the signals from each of the respective sensors at different frequencies depending upon an expected frequency of the motion that the sensor is designed to detect. For example, an output of a sensor configured to detect the roll about the x-axis may be sampled less frequently than an output of a sensor configured to detect pitch or yaw. Further, in some embodiments, a plurality of sensors are employed to sense a particular flight characteristic such as pitch, yaw or roll.

In one embodiment, one or more multi-axis accelerometers are employed. For example, a first dual axis accelerometer may be disposed in the x-y plane, a second dual axis accelerometer may be disposed in the x-z plane and a third dual axis accelerometer may be disposed in the y-z plane. According to this embodiment, the electronic apparatus may include one or more gyroscopes in addition to the plurality of accelerometers.

Figure 8:
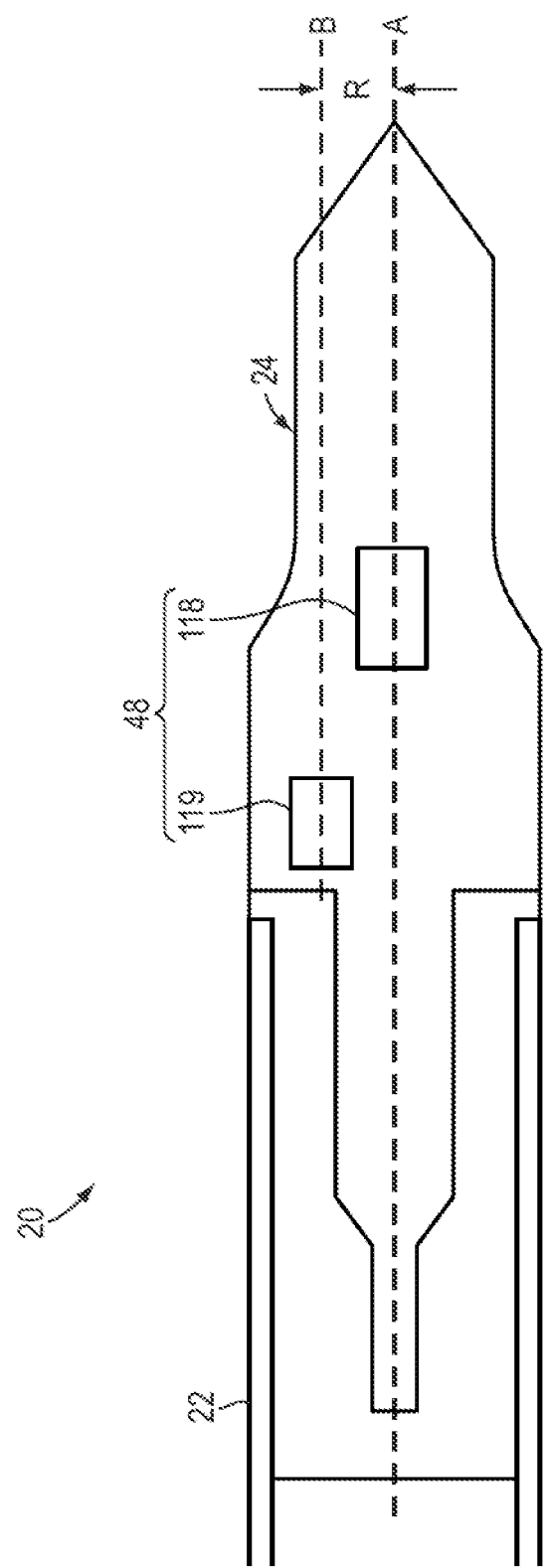
FIG. 8 illustrates an arrow tip in accordance with a further embodiment of the invention.

Referring to FIG. 8, an arrow 20 including a tip 24 including an electronic apparatus 48 is employed in accordance with one embodiment. The tip includes a first longitudinal axis A (for example, an axis about which the tip 24 is co-axially located) and a second longitudinal axis B. In accordance with one embodiment, the axis B is located parallel to the axis A at a distance R. Further, in one embodiment, the electronic apparatus 48 includes a linear accelerometer 118 and an angular accelerometer 119. In accordance with one embodiment, the linear accelerometer 118 is co-axially located about the axis A and the angular accelerometer 119 is located along the axis B. In a further embodiment, data from the linear accelerometer 118 is employed to determine a velocity of the arrow 20 in a direction along the axis A.

As is described herein, various embodiments of the invention may only use power during short periods (for example, only during the flight of the arrow) and/or have relatively low power consumption. Accordingly, in one embodiment, the electronic apparatus 48 is a disposable item including an integral power source that is not replaceable. Alternatively in other embodiments, the power source may be accessed for removal and replacement or recharging, while in still further embodiments the power source may be recharged without removal from the electronic apparatus 48.

Embodiments of the invention may be employed with a variety of commonly available archery equipment including compound bows, recurve bows, longbows, crossbows or any other style of bow suitable for shooting an arrow. Further, the electronic apparatus 48 may be included (in full or in part) in any of a variety of styles and types of tips 24 including bodkin, broadhead, blunt, Judo, field point, fish point and target heads. The electronic apparatus 48 may be employed with any of a variety of arrow shafts 22 including shafts manufactured from any of wood, aluminum, carbon and fiberglass. Further, embodiments may be employed with a shaft 22 that is hollow, partially hollow or solid. The preceding identification of various bows, tips and shafts are provided as examples and the invention may be employed with other styles and types of archery equipment.

Referring again to FIG. 4A, according to one embodiment, the electronic apparatus 48 is included in a tip (e.g., the tip 24) that is of the same form factor as one or more "standard" size arrow tips. Further, in various embodiments, the mass of the tip 24 in which the electronic apparatus 48 is housed is manufactured to have a mass that is substantially equal to the mass of one or more "standard" size arrow tips that are not equipped with any electronics. For example, at present, some commonly available field points are provided in the following standard sizes 75 grains, 90, grains, 100 grains, 125 grains and 140 grains. These may be referred to as "commercially-available standard size" tips which refers to the fact that such tips are generally available to archers through retail sales outlets (e.g., brick and mortar or internet sales outlets). Thus, in a version of this embodiment, the mass of the tip 24 with which the electronic apparatus 48 is employed is 100 grains including the mass of the electronic apparatus 48. In various embodiments, the mass of the tip is substantially equal to a commercially-available standard size tip with the complete electronic apparatus 48 integrated within the tip.

In accordance with one embodiment, the tip 24, including all or a portion of the electronic apparatus 48, may be configured to provide an arrow 20 equipped with the tip 24 with substantially the same flight characteristics as an arrow 20 equipped with a commonly available tip (e.g., a commercially-available standard tip). That is, the commonly available tip provides a model set of aerodynamic properties and may be referred to as a "model" tip. In various embodiments, flight characteristics can be made substantially similar by providing the tip 24 with one or more physical characteristics that are substantially similar to the physical characteristics of the selected tip.

For example, where the physical characteristics are selected to provide the tip with one or more aerodynamic properties substantially similar to the aerodynamic properties of the selected tip. In accordance with one embodiment, one or more aerodynamic properties of the tip 24 (including the electronic apparatus 48) are substantially matched to one or more aerodynamic properties of the selected tip. According to some embodiments, the housing 27 is configured to provide an arrow 20 equipped with the tip 24 with substantially the same flight characteristics as an arrow 20 equipped with a commonly available tip.

As used herein the term "flight characteristics" refers to characteristics such as the acceleration, velocity, trajectory, pitch, roll and yaw of an arrow in flight.

In accordance with some embodiment, the aerodynamic properties of an arrow tip equipped with all or a portion of the electronic apparatus 48 can be configured to better match the aerodynamic properties of a standard arrow tip (e.g., an arrow tip that does not include any of the electronic apparatus 48) by considering the structure of the standard arrow tip. In particular, the aerodynamic properties of the arrow tip (whether equipped with the electronic apparatus 48 or unequipped) effect the flow of air over the arrow tip during the flight of the arrow for example, an affect of any drag or lift of the tip in flight. These aerodynamic properties may be affected by the physical characteristics of the arrow tip 24; including, the shape of the tip 24; whether the tip is solid or includes one or more internal air passages; whether the tip includes any surface texture, and if so, the shape and depth of the texture;

whether the tip 24 includes any structure that extends (e.g., projections) from the body 43 (for example, the blades of a broadhead or the arms of a judo tip); and if the tip includes structure extending from the tip, the distribution of mass and the wind resistance of the structure.

In accordance with one embodiment, the aerodynamic properties of the arrow tip 24 including all or a part of the electronic apparatus 48 are configured to substantially match the aerodynamic properties of an arrow tip that is unequipped with any of the electronic apparatus 48. According to some embodiments, the flight characteristics of an arrow equipped with the arrow tip 24 including the electronic apparatus 48 more accurately replicate the flight characteristics of an arrow equipped with a standard tip when the arrow tip 24 including the electronic apparatus is configured with aerodynamic properties that substantially match the aerodynamic properties of the commercially-available standard size tip.

Figure 14A:
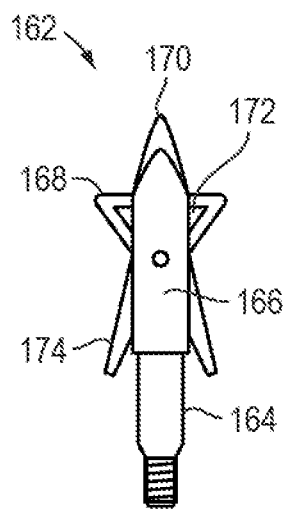
FIGS. 14A-14C illustrate arrow tips in accordance with further embodiments of the invention.
Figure 14B:
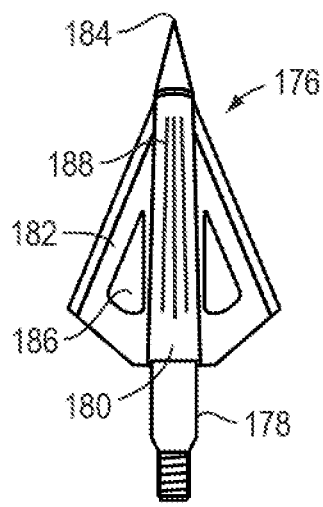
Figure 14C:
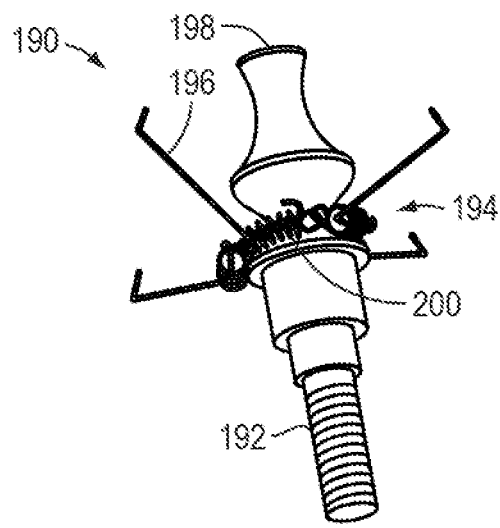

Referring now to FIGS. 14A-14C, arrow tips in accordance with various embodiments are illustrated. FIG. 14A illustrates an embodiment of an arrow tip 162 including all or a portion of the electronic apparatus 48. According to one embodiment, the overall shape of the arrow tip 162 is intended to substantial match an overall shape of a commonly-available mechanical broadhead that does not include any of the electronic apparatus 48. In one embodiment, the arrow tip 162 includes a shaft 164, a body 166, blades 168 (e.g., projections) and a point 170. In one embodiment, portions of the electronic apparatus are located within any one or a combination of the shaft 164, the body 166, the blades 168 and the point 170. In accordance with one embodiment, the structure of the blades 168 is intended to substantially match the structure of the retractable blades (with or without the cutting edges) of the mechanical broadhead after which it is modeled. Included in this structure are separate opening 172 provided in a portion of each of the blades 168 and a projection 174 (e.g., a tail portion of each of the blades 168).

FIG. 14B illustrates an embodiment of an arrow tip 176 including all or a portion of the electronic apparatus 48. According to one embodiment, the overall shape of the arrow tip 176 is intended to substantial match an overall shape of a commonly-available fixed-blade broadhead that does not include any of the electronic apparatus 48. In one embodiment, the arrow tip 176 includes a shaft 178, a body 180, blades 182 (e.g., projections) and a point 184. In one embodiment, portions of the electronic apparatus are located within any one or a combination of the shaft 178, the body 180, the blades 182 and the point 184. In accordance with one embodiment, the structure of the blades 182 is intended to substantially match the structure of the fixed blades (with or without the cutting edges) of the fixed-blade broadhead after which it is modeled. Included in this structure are separate opening 186 provided in a portion of each of the blades 182. In addition, in one embodiment, the body 180 includes a surface texture 188, for example, micro-grooves.

FIG. 14C illustrates an embodiment of an arrow tip 190 including all or a portion of the electronic apparatus 48. According to one embodiment, the overall shape of the arrow tip 190 is intended to substantial match an overall shape of a commonly-available judo point arrow tip that does not include any of the electronic apparatus 48. In one embodiment, the arrow tip 190 includes a shaft 192, a body 194, arms 196 (e.g., projections) and a blunt point 198. In one embodiment, portions of the electronic apparatus are located within any one or a combination of the shaft 192, the body 194, the arms 196 and the point 198. In accordance with one embodiment, the structure of the arms 196 is intended to substantially match the structure of the arms of the judo point after which it is modeled. Further, embodiments of the body 194 may also include structure 200 that substantially matches the structure (e.g., the springs) typically found in the body of a standard judo point.

As described above, in various embodiments, each of the arrow tips 164, 176 and 190 illustrated in FIGS. 14A-14C provide a structure that is substantially similar to a structure of an arrow tip that may be commonly available and that does not include an electronic apparatus. Thus, embodiments of the arrow tips 164, 176 and 190 achieve flight characteristics that are substantially similar to flight characteristics of the commonly available tip after which they are modeled at least, in part, because the arrow tips provide substantially similar aerodynamic properties to the arrow tip after which they are modeled. Thus, various embodiments provide an arrow tip equipped with an electronic apparatus that provides data concerning the flight characteristics in a package that assists in substantially replicating the flight characteristics of a model tip. Consequently, embodiments of arrows equipped with any of the arrow tips 164, 176 and 190 can provide an arrow equipped with the tip with flight characteristics substantially similar to an arrow equipped with a standard tip. The preceding characteristics can provide advantages when employed in a tuning process as described below.

In some embodiments, the tip 24 may be weighted to provide a balanced distribution of mass about longitudinal axis of the tip 24. In one embodiment, the mass of the tip 24 is adjusted both along a radial axis extending from the longitudinal axis and along the longitudinal axis itself. For example, the mass of the tip may be adjusted by adjusting the mass along a radial axis to co-axial center the mass about the longitudinal axis. That is, in one embodiment, by adjusting the mass along a radius "r" extending radially outward from the longitudinal axis.

In further embodiments, the mass may be adjusted in response to a pre-determined arrangement of the components of the electronic apparatus 48. For example, in some embodiments, the electronic apparatus 48 is lighter (e.g., has a lower density) than the housing 27. Thus, in some embodiments, the mass of various regions of the housing may be selected to provide a balanced tip 24 including the electronic apparatus 48. In one embodiment, the location or locations of the electronic apparatus 48 or various components thereof, respectively may be adjusted to provide the tip 48 with the desired distribution of mass (e.g., weight).

According to one embodiment, the housing 27 fully encloses the electronic apparatus 48 (e.g., the apparatus may be fully sealed within the housing) so that the aerodynamic properties of the electronic apparatus do not effect the aerodynamics of the tip 24.

In a further embodiment of the invention, a process provides a method of selecting a mass of an arrow tip including an electronic apparatus by: a) determining a mass of a selected standard-size tip; b) selecting the electronic apparatus to be housed in the arrow tip; c) determining a mass of the electronic apparatus or portion thereof to be included in the arrow tip; and d) adjusting the mass of the housing such that the mass of the housing plus the electronic apparatus (or portion thereof) is substantially equal to the mass of the selected standard-sized tip. The preceding is an exemplary process and may be modified to add or eliminate various steps such that the mass of a tip including an electronic apparatus is substantially equal to a desired mass, e.g., a mass of a commercially-available target tip or hunting tip.

For example, the process may involve acts of locating the electronic apparatus (or a portion thereof such as the power source) in a particular location along the longitudinal axis (e.g., axis X in FIG. 4A) of the tip 24 to provide a distribution of mass that is substantially equal to the distribution of mass of a selected standard-sized tip. In the immediately preceding example, other approaches may be employed in addition to or separately. For example, acts of distributing and/or locating the mass of the electronic apparatus co-axially about the longitudinal axis or radially outward from the longitudinal axis by a particular distance may be employed in a process in accordance with one embodiment.

In yet another embodiment of the invention, a process provides a method of selecting flight characteristics of an arrow tip including the electronic apparatus 48 to be substantially similar to the flight characteristics of a selected commercially available standard tip. According to one embodiment, such a process may include acts of a) determining flight characteristics of a selected standard tip; b) determining one or more physical characteristics of the selected standard tip wherein the physical characteristics may impact one or more aerodynamic properties of the selected standard tip; c) selecting the electronic apparatus to be housed in the arrow tip; c) determining an effect on the flight characteristics of the tip 24 including the apparatus; and d) selecting one or more physical properties of the tip 24 including the apparatus such that the flight characteristics of the tip 24 are substantially similar to the flight characteristics of the selected standard tip. In accordance with one embodiment, a process includes acts of determining flight characteristics of an arrow equipped with the selected standard tip and determining flight characteristics of the arrow equipped with the tip 24 including the electronic apparatus 48. The preceding acts are exemplary. These acts may be modified to add or eliminate various acts.

An arrow released from a bow travels a generally parabolic flight path from the archer to the target. An arrow's flight may also include a deflection of the arrow shaft that can be created when the arrow is released. For example, the arrow tip generally has the highest concentration of mass of an arrow. Accordingly, compressive forces act on the arrow shaft when the arrow is propelled from the bow. That is, the energy stored in the bow when the bow is at full draw is directed from the arrow string to the nock located at the proximate end of the arrow when the archer releases the bow string. The mass of the arrow tip tends to resist the forward motion transferred to the arrow from the string. Thus, when the bow string is first released, the arrow shaft is subject to compressive forces because the proximate end of the arrow (i.e., where the nock is located) accelerates more rapidly than the distal end where the arrow tip is located. These compressive forces result in a deflection of the arrow shaft in flight because an oscillating compression wave is imparted in the shaft of the arrow. As a result, the accuracy of the arrow may be decreased.

Further arrows generally rotate about their linear axis during flight. This rotation often assists in making the arrow's flight more stable and accurate. A further result, however, is that the arrow shaft can undergo one or more complete rotations during the time it travels from the archer to the target. These rotations also affect the flight characteristics of the arrow.

In some embodiments, the general objective of an archery tuning process is a stable and consistently repeatable flight of an arrow shot from a bow which results in a satisfactory degree of accuracy. In general, the process of tuning archery equipment involves an adjustment of one or more characteristics of the equipment (e.g., the bow, the arrow, the release aid, nocking point, etc.) until a satisfactory level of accuracy and consistency in an arrows flight is achieved. The archery-tuning process may also including adjusting the technique of an archer such that the tuning takes into account the individualized effect on equipment performance found with a specific user. Thus, the archery-tuning process can include a collection of data from the archer as well as any of the arrow, the bow or other archery equipment.

According to one embodiment, the process can include an adjustment of an individual element of the archery system (i.e., the equipment and the technique of the archer). In a further embodiment, the archery-tuning process can include an adjustment of a plurality of individual elements. In still other embodiments, the archery-tuning process can include an adjustment of the technique of the archer alone or in combination with one or a plurality of individual elements.

Various embodiments of the invention may be employed in a process of tuning archery equipment by providing information concerning the flight characteristics of the arrow 20. For example, a first shot (or plurality of shots) may be taken using an arrow equipped with an electronic apparatus. The data collected during the shot or series of shots may be evaluated and used to select one or more adjustments that can be made in equipment or technique. A subsequent shot or series of shots may be employed and further data gathered from the electronic apparatus. The process may be repeated until the archery equipment (and in some cases the archer) perform as required to achieve a desired level of accuracy and/or consistency.

The archery-tuning process can also include the use of a bow-mounted sensor to collect data concerning the movement of the bow during one or a plurality of shots. This data can be used alone or in combination with data collected from an arrow-mounted electronic apparatus.

Some embodiments employ the flight data provided by the accelerometer(s) included in the electronic apparatus 48 to determine the stability of the arrow in flight. In accordance with one embodiment, any one of or any combination of the yaw of the arrow, the roll of the arrow and the pitch of the arrow may be determined to from the flight data. This information can be used in one embodiment to evaluate the stability of the arrow in flight, and consequently, the tuning of the archery system. For example, an arrow shot from a poorly tuned archery system often exhibit particular types of instability, for example, "porpoising" (a generally vertical alternating displacement of the distal and proximate ends of the arrow), "fishtailing" (a generally horizontal alternating displacement of the distal and proximate ends of the arrow), and minnowing (a form of generally horizontal alternating displacement of the distal and proximate ends of the arrow at a higher frequency than fishtailing). Often, the origins of the unstable flight can be more easily determined once the type of instability is identified. That is, certain incorrect equipment settings or mismatches in equipment combinations can lead to known types of instability. For example, porpoising can result where the nock height is set incorrectly and fishtailing can result from an arrow tip having too great a mass or a draw weight being set too light for a particular combination of equipment. Accordingly, the flight characteristics determined with data provided by the electronic apparatus 48 can be employed to identify adjustments in the equipment settings and/or equipment combinations that can improve the flight of the arrow.

Archer's select an arrow shaft 22 with particular characteristics that are generally compatible with the bow with which the shaft is used. The characteristics of the bow include the draw length, the draw weight and bowstring material (strands, composition, serving, length, twists, etc.). Characteristics of the shaft 22 that may be considered are the length and stiffness (sometimes referred to as "spine"). A properly selected shaft may help decrease the deflection because it has a stiffness suitable for the force applied to it by the bow with which it is used. That is, a shaft that is properly matched with the bow (e.g., the draw weight of the bow) and a mass of the tip can minimize the magnitude of the compression wave, and correspondingly, the deflection of the arrow shaft when the arrow is shot from the bow. Other properties of the arrow that may affect the flight characteristics of the arrow are the selection of the vanes or fletching, the selection of the tip 24, the straightness of the arrow shaft 22 and the location of the balance point of the arrow along the longitudinal axis.

Figure 9:
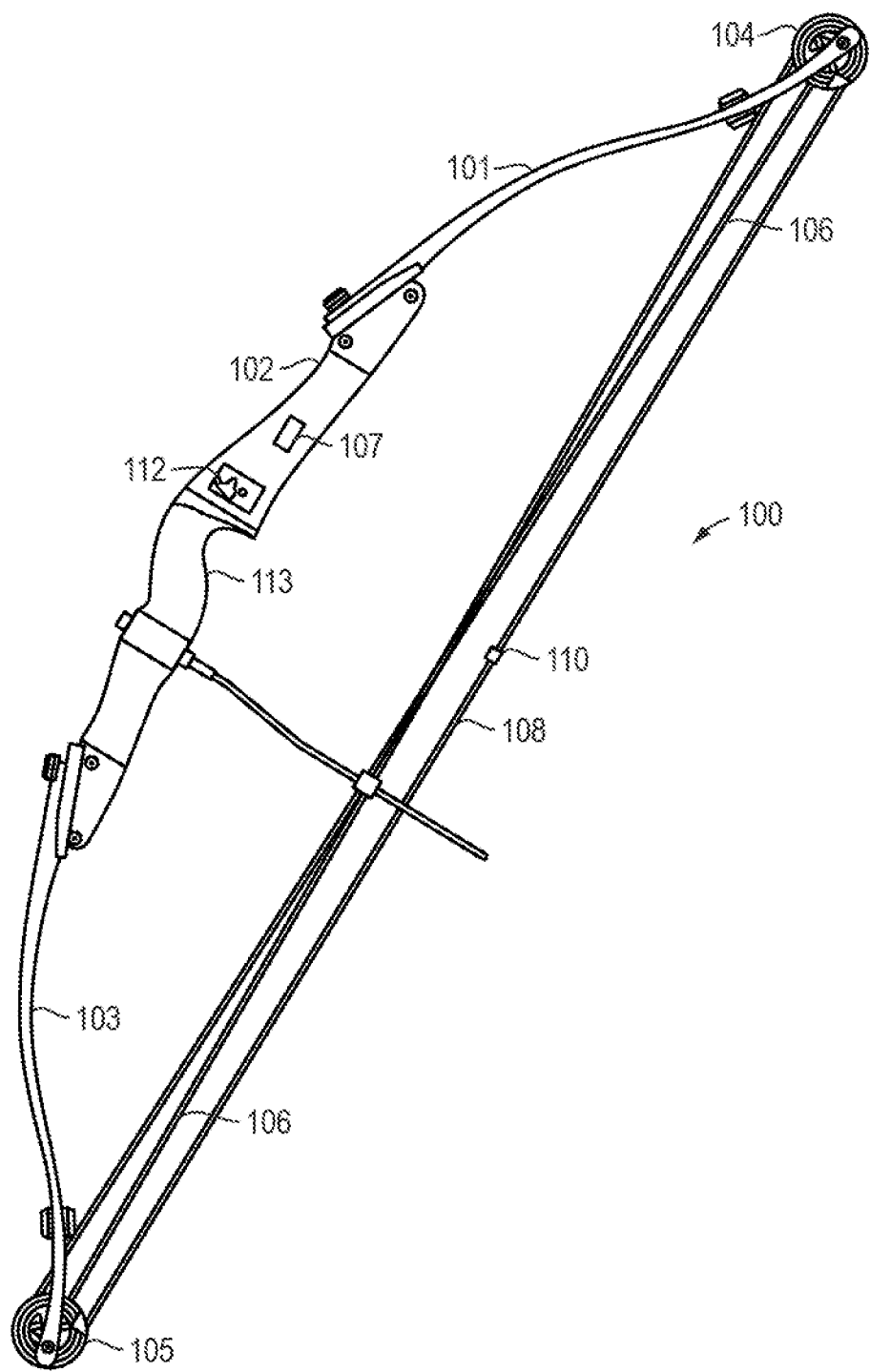
FIG. 9 illustrates a bow in accordance with one embodiment of the invention.

Many factors can affect the accuracy of an arrow shot from a bow. Some of these factors are equipment related, some are related to the archer's technique and still others result from a combination of the preceding. FIG. 9 illustrates a bow 100 in accordance with one embodiment (e.g., a compound bow.). The bow 100 includes a riser 102, a grip 113, an upper limb 101, a lower limb 103, an upper wheel or cam 104, a lower wheel or cam 105, cables 106, a bowstring 108, a nocking point 110 (e.g., a ring secured to the bowstring) and an arrow rest 112. Some other properties of the bow 100 that may affect the flight characteristics of the arrow are the style and type of arrow rest, the location/alignment of the arrow rest, the location/alignment of the nocking point 110, the type of wheels or cams 104, 105 that are employed, the timing of the cams 104, 105, etc.

As mentioned above, flight characteristics may also be caused by the archer's technique including acts occurring before, during or immediately subsequent to the release of the bowstring by the archer. For example, a traditional archery technique involves the archer grasping the strings of the bow with their fingers to draw the arrow back prior to taking a shot. The archer then releases the grip on the string to shoot the arrow. In general, this traditional approach imparts a lateral motion in the bowstring as the bow string slides off of the archer's fingers when released. This lateral motion may be an additional cause of vibration in the arrow. More modern approaches, employ mechanical release aids (e.g., calipers) that may reduce but not entirely eliminate deflection in the arrow shaft in flight. An archer may also cause deflection due to a lack of concentration when releasing the arrow, for example, the archer may move in anticipation of the release of the shot, they may not be holding the bow vertical (i.e., plumb) at the moment the arrow is released, etc.

Because an archer's technique may effect the flight and accuracy of an arrow, some embodiments of the invention employ feedback concerning the archer in the bow-tuning process. In particular, some embodiments employ one or more sensors to detect actions of the archer proximate the point in time at which the string is released by the archer and the arrow is shot from the bow. These measurements can be employed to determine whether the archer's actions are negatively impacting the flight of the arrow (e.g., the accuracy).

Referring to FIG. 9, in accordance with some embodiments, a bow-mounted sensor 107 is employed to detect motion of the bow. In accordance with one embodiment, the motion of the bow at or near the time at which an arrow is shot from the bow is of particular interest because such motion can effect the flight of the arrow. Further, in various embodiments, the addition of the bow-mounted sensor can be useful in determining whether (and how) a technique of the archer may be impacting the flight of arrow because the archer's technique is often reflected in the position and movement of the bow.

In the illustrated embodiment, the bow-mounted sensor is located on the riser 102 above the location of the grip 113. However, the bow-mounted sensor 107 can be located anywhere on the bow, and accordingly, the location of the bow-mounted sensor 107 may vary in different embodiments. In some embodiments, the bow-mounted sensor 107 is an integral component of the bow. In other embodiments, the bow-mounted sensor 107 can be temporarily attached to the bow for purposes of system tuning. For example, bows are generally manufactured to include threaded holes of other fastening-structure which are provided for the attachment of accessories such as stabilizers, sites, rests, quivers, etc. These accessories may be supplied by the manufacturer or by a third party. In one embodiment, the bow-mounted sensor 107 is configured for attachment at one of these available locations that is established for the attachment of archery equipment accessories.

In accordance with one embodiment, the bow-mounted sensor 107 is located at or near a distal end of the upper limb 101 and the lower limb 103. Such a configuration may be advantageous because an archer's technique and movement are transferred from the archer to the bow 100 at the grip 113. Accordingly, the grip 113 acts as a fulcrum or pivot about which the remainder of the bow can rotate in various directions. The movement can result, from example, in changes in an archer's stance, grip, wrist position, shoulder position, etc. or any combination of the preceding. Some of these changes may be voluntarily made by the archer, for example, as they change their point of aim. Other changes may be involuntary. Generally, the bow 100 moves to some degree upon release of the bow string due to the torque created when the potential energy stored in the bow 100 is released. Because the bow acts as a lever when it pivots about the region of the grip, the movement at the grip 113 translates into a larger movement the greater the distance traveled along the bow from the grip. Accordingly, a relatively small movement of the bow at the grip 113 may result in a much larger movement at the distal end of the limbs, i.e., in the case of a compound bow in the region proximate the cams 104, 105, respectively.

Figure 11A:
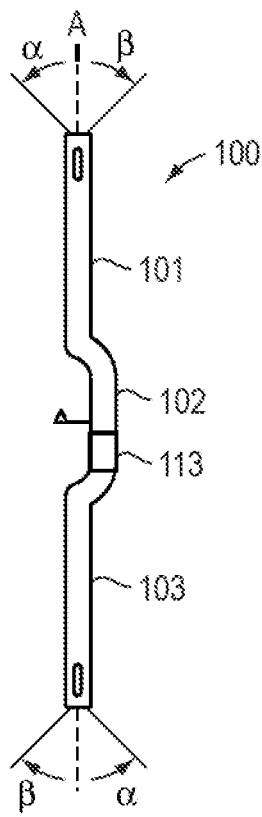
FIGS. 11A and 11B illustrate a bow in accordance with another embodiment of the invention.
Figure 11B:
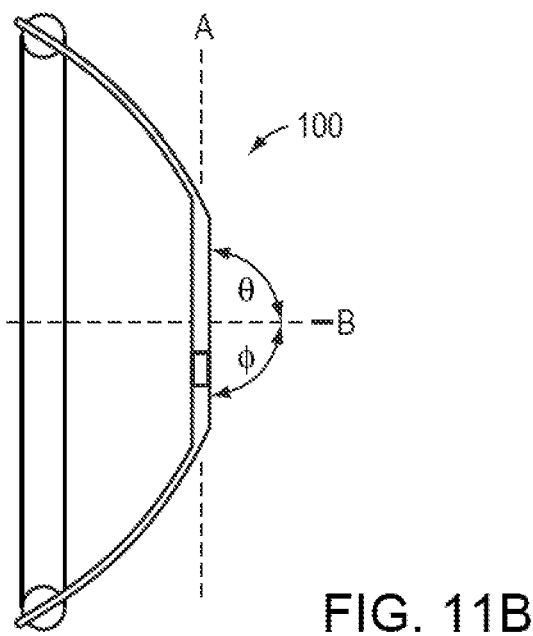

In accordance with some embodiments, the bow-mounted sensor 107 includes one or more accelerometers. The accelerometers may be oriented in various configurations to detect motion along particular axes, e.g., to detect a particular type of motion. For example, referring now to FIGS. 11A and 11B, one or more sensors may be included in the bow 100 to detect motion relative to a vertical axis A. That is, to detect whether the bow is canted to the left or the right, FIG. 11A. In accordance with one embodiment, the bow-mounted sensor 107 (or sensors) are oriented to detect movement resulting in the bow being offset from vertical by any of the angles α and β, where the angles are measured relative to the vertical axis A. Further, in some embodiments, the bow-mounted sensor 107 is located to detect motion relative to the horizontal axis B. That is, to detect whether the bow is tilted forward or backward, FIG. 11B. In accordance with one embodiment, the bow-mounted sensor 107 (or sensors) are oriented to detect movement resulting in the bow being offset from vertical by any of the angles θ and ϕ, where the angles are measured relative to the horizontal axis B. In some embodiments, one or more bow-mounted sensors 107 are employed to detect movement relative to each of the vertical axis A and the horizontal axis B.

As mentioned above, the bow-mounted sensor 107 may be temporarily or permanently attached to the bow 100. Thus, in some embodiments, the bow-mounted sensor includes a housing that includes fastening structure such as one or more holes (threaded or unthreaded) for use with a screw or a bolt, clips or other mounting hardware to allow the bow-mounted sensor to be attached to the bow 100.

As used with reference to FIG. 9, the term "bow-mounted sensor" refers to a device that can include a sensor and other items. For example, in some embodiments, the bow-mounted sensor 107 can include an electronic apparatus having one or more of a power source, electronic circuitry and a communication interface as illustrated in FIG. 3, e.g., the electronic apparatus 48. Further, the bow-mounted sensor can include any of, or any combination of, an A/D converter, a MUX, a wireless transmitter, a sensor, a processor and a memory, similar to that illustrated in FIG. 5. In various embodiments, the bow-mounted sensor 107 may be included in a wired or a wireless device. Where the bow-mounted sensor 107 is included in a wired device a communication interface can include a port configured for a hardwired connection to, for example, a base station that is included adjacent the archer who is using the bow.

Figure 10:
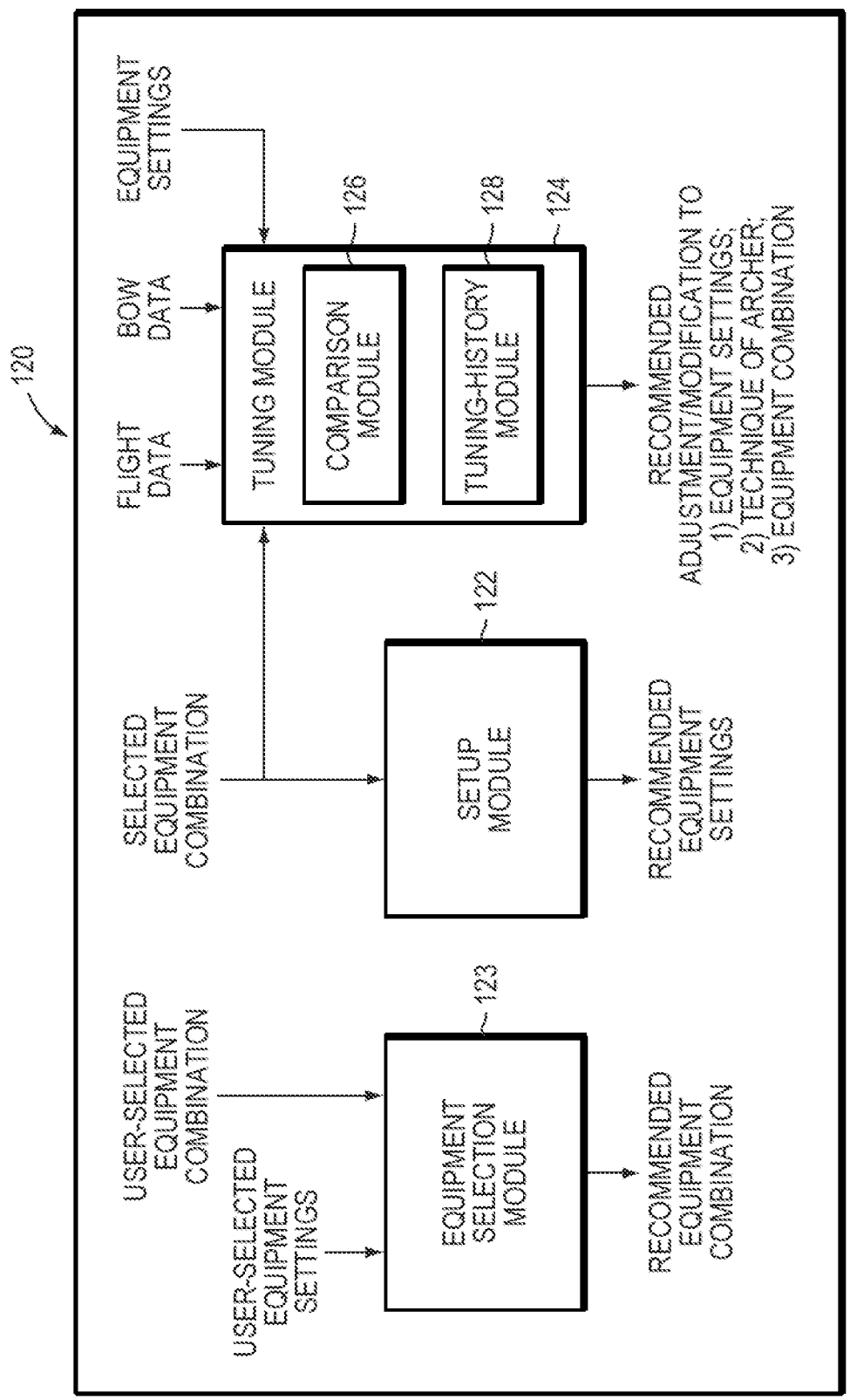
FIG. 10 illustrates a system in accordance with an embodiment of the invention.

Referring now to FIG. 10, a system 120 is illustrated in accordance with another embodiment. In some embodiments, the system 120 is employed to assist a user in achieving a desired performance of archery equipment and/or a desired performance of an archery system including archery equipment and an archer. According to one embodiment, the desired performance concerns a desired level of accuracy and consistency in the flight of an arrow shot from a bow by the archer. According to a further embodiment, the system allows a user to achieve a desired performance for a selected configuration of archery equipment including, for example, a selected arrow configuration and a selected bow configuration.

In general, embodiments of the system 120 can be employed to assist a user in selecting archery equipment, selecting settings for archery equipment and refining either or both of the selection of the archery equipment and the settings of the archery equipment to achieve a desired flight of an arrow. In various embodiments, the system 120 can include one or a combination of a setup module 122, an equipment selection module 123 and a tuning module 124. Further, in some embodiments, the tuning module includes one or both of a comparison module 126 and a tuning-history module 128. Each of the setup module 122, the equipment selection module 123, the tuning module 124, the comparison module 126 and the tuning-history module 128 may be implemented in hardware, software or a combination of hardware and software.

In accordance with one embodiment, the setup module 122 receives a selected equipment combination as input and generates one or more recommended equipment settings as output. According to one embodiment, the recommended equipment settings are established because they are known to be suitable with the selected equipment combination to provide a desired level of performance, such as accuracy, speed, low decibel level, consistency, any combination of the preceding or any of the preceding in combination with other performance measurements.

As used herein, "equipment combination(s)" can refer to features of the bow, features of the arrow, features of each of the bow and the arrow and features of other equipment (for example, a release aid, an arrow rest, etc.) alone or in combination with any of the preceding. In general, the features of a particular equipment combination are selected by an archer and are not adjustable once the equipment combination is selected without, for example, replacing a particular piece of equipment. For example, an archer may select any of the following to revise the equipment combination: 1) a different model bow produced by the same or different manufacturer; 2) a different bow string; 3) a different style tip; 4) a different mass of the selected tip; 5) a different arrow shaft; 6) a different type of fletching, etc.

As used herein, "equipment setting(s)" refer to settings or adjustments that are employed with equipment combination(s). Some examples of equipment settings include: 1) a draw weight of the bow; 2) a location of a nocking point on the bow string; 3) a lateral position of the arrow rest; 4) a vertical position of the arrow rest; 5) a brace height of a bow; 6) a trigger pressure at release of a mechanical release aid; 7) an elevation of a sight (or portion thereof); 8) a lateral position of a sight (or portion thereof); 9) a draw length; 10) an adjustment of the timing of the cam, etc.

Additional equipment related factors that may affect the flight characteristics of the arrow include any one of the following factors alone or in combination with any of these and other factors: the material of the finger tab; the nock and its grip on the string; a resistance provided by a plunger button; and the settings of brace height.

As should be apparent to those of ordinary skill in art, some items may be considered a part of an equipment combination under one set of circumstances, and may alternatively, be considered an equipment setting in another set of circumstances. For example, the draw length of a bow is often fixed with the selection of the bow. Sometimes, however, a bow may include an ability to adjust the draw length. Thus, the draw length can be considered a part of an equipment combination in the first circumstance while the draw length can be considered an equipment setting in the second circumstance. Similarly, the brace height of a longbow can be adjusted while, generally, the brace height of a selected compound bow is fixed. Accordingly, the brace height can be considered an equipment setting in the first circumstance and the brace height can be considered a part of an equipment combination in the second circumstance. Some other features of archery equipment may be treated similarly.

In accordance with one embodiment, the equipment selection module 123 receives user-selected equipment settings and/or an identified equipment combination (e.g., an equipment combination that is incomplete) and generates a recommended equipment combination as an output. In general, in one embodiment, the equipment selection module 123 generates a recommended equipment combination because it suits an archer based one or more of the selected equipment settings and/or one or more pieces of user-selected equipment. For example, where a user-selected equipment combination including a selected bow and selected arrow tip mass is provided as input as the user-selected equipment and a draw weight is provided as a user-selected equipment setting, the equipment selection module can generate a selected arrow shaft and/or arrow-tip mass as an output for inclusion with the user-selected equipment combination.

In some embodiments, a user may not provide any information concerning selected equipment and may instead rely on the equipment selection module 123 to provide the recommended equipment combination based on the user selected equipment settings. For example, the user may provide any of a draw length, a draw weight along with other baseline information such as the style of bow that the archer plans to employ (recurve, longbow, compound bow, crossbow, etc.), the intended use the of the equipment (Olympic competition, FITA competition, hunting, 3D shooting, indoors, outdoors, etc.). Based on the equipment settings, the selection module 123 can generate an output concerning a recommended equipment combination.

In accordance with one embodiment, the user-selected equipment combination that is provided by the user is incomplete. In accordance with this embodiment, the equipment selection module 123 can employ the information that is provided concerning the user-selected equipment combination along with the user-selected equipment settings to determine a complete or more complete equipment combination.

That is, the unknown elements of the user-selected equipment combination can be identified and output by the equipment selection module 123. In a further embodiment, the equipment selection module is not provided with any information concerning a user-selected equipment combination. Instead, the equipment selection module outputs a recommended equipment combination based on the user-selected equipment settings as input.

Table 1 illustrates some of the information that may be output by the equipment selection module 123.

TABLE 1

| Archer | Bow (Make and Model) | Release Type (mechanical, fingers) | Draw Weight | Draw Length | Arrow Type (Mfg. and Shaft Stiffness) | Arrow Shaft Length | Arrow Tip Mass |
|---|---|---|---|---|---|---|---|
| EDZ | | | | | | | |
| SCY | | | | | | | |
| TAJ | | | | | | | |

In accordance with another embodiment, the setup module 122 receives a selected equipment combination as input and generates one or more recommended equipment settings as output. According to one embodiment, the recommended equipment settings are established because they are known to be suitable with the selected equipment combination to provide a desired level of performance, for example, to provide a desired level of stability, accuracy, speed, low decibel level upon release of the arrow, consistency, any combination of the preceding or any of the preceding in combination with other performance measurements.

Accordingly, in some embodiments, equipment settings may be established by an archer's selection of equipment. Often, for example, an archer purchases a particular bow based on any of price, performance, brand loyalty, etc. In one approach, an archer selects a basic equipment setup (one or more of a bow, an arrow, a sight, a release, etc.) that remains substantially fixed once selected. In this approach, the setup module may be employed by the user to adjust the equipment settings to achieve a desired level of accuracy "right out of the box" for the selected equipment combination. For example, the system 120 may receive information concerning an equipment combination.

Table 2 illustrates some of the information that may be output by the equipment setup module 122.

Examples of recommended adjustments to equipment settings include adjustments to any of the nock height, the draw weight, cam timing, arrow rest elevation, arrow rest lateral alignment; pin height, arrow shaft stiffness (spine); arrow shaft length; arrow shaft mass, arrow tip mass, etc. Examples of recommended adjustments of the technique/form of the archer include adjustments to any of a foot position, a stance, a grip, a follow-through, etc. According to one embodiment, examples of recommended equipment combinations include recommendations to use a bow with a different draw length, to use a bow with a lower minimum draw weight, to use an arrow with a longer shaft, to use an arrow with a shaft having a different spine (either more or less flexible), to use a different arrow tip, to add a string loop, to use a different release, etc. The preceding are intended to provide some examples. These examples are not intended to provide a comprehensive list of examples. Accordingly, embodiments of the tuning module may provide other and various combinations of recommended adjustments and modifications.

In accordance with some embodiments, the system 120 is employed in combination with an electronic apparatus included in the arrow, for example, in combination with one or more embodiments of the electronic apparatus described above, e.g., with the electronic apparatus 48. Thus, data for one or more arrow-flights can be provided by a sensor included in the arrow. In some embodiments, the tuning module 124 receives the data as flight-data input. In accordance with one embodiment, the tuning module 124 generates a recommended adjustment/modification based on flight data without employing information concerning the selected equipment combination, bow data or equipment settings. In other embodiments, the tuning module may employ flight data in combination with one or more of information concerning the selected equipment combination, bow data and equipment settings. Further, in accordance with one embodi-

TABLE 2

| Archer | Location of Nocking Point | Sight - Lateral Position | Sight - Elevation | Draw Weight | Cam Timing | Brace Height | Arrow Tip Mass |
|---|---|---|---|---|---|---|---|
| EDZ | | | | | | | |
| SCY | | | | | | | |
| TAJ | | | | | | | |

In accordance with one embodiment, the tuning module 124 receives one or a combination of a selected equipment combination, flight data, bow data and equipment settings as input(s) and generates as output one or any of the following in combination with each other or additional recommendations: 1) a recommended adjustment of one or more equipment settings; 2) a recommended adjustment of the technique of the archer; and 3) a recommended modification of the equipment combination employed by the archer.

ment, the information concerning the selected equipment combination does not include specific information concerning, for example, a make and model of various equipment but may be more generic. That is, the selected equipment combination may provide information concerning the type of bow (compound, recurve, longbow, crossbow, etc.), whether a release device is employed, etc.

In accordance with some further embodiments, the system 120 is employed with a bow-mounted sensor (e.g., the bow mounted sensor 107). According to these embodiments, data collected for one or more arrow-flights can be provided by the bow-mounted sensor as bow-data input. According to one embodiment, the bow-data is provided in addition to the flight data. In another embodiment, bow-data is provided and flight data is not provided.

In one embodiment, the tuning module may employ the results of prior flight testing and tuning of a plurality of combinations of archery equipment (e.g., commonly-used archery equipment). The results can establish one or more sets of adjustments that are known to provide a desired level of performance for the tested equipment. Data for the archery equipment that is being tuned can be compared with the known results and/or known settings. That is, the tuning module 124 can employ the known results when analyzing the information provided by any of the flight data, bow data, selected equipment combination, and equipment settings to provide the recommended adjustments/modifications that the tuning module provides as output.

In accordance with one embodiment, the system 120 includes one or more databases that store the known test results and known equipment settings. The tuning module 124 can be configured to retrieve the relevant information from the database as it is needed during the tuning process. In accordance with one embodiment, the database is included in the tuning module 124. In a further embodiment, the data base is included in the comparison module 126.

In some embodiments, the system 120 includes a comparison module 126 that is employed to analyze the current flight characteristics of an arrow, to compare those results with the known results for similar equipment and to generate any of a recommended adjustment to the equipment settings, a recommended adjustment to the technique of the archer and/or a recommended modification to the equipment combination. In the illustrated embodiment, the comparison module 126 is included in the tuning module 124. In an alternate embodiment, the comparison module 126 is included elsewhere in the system 120.

Often, the process of tuning an archery system includes a plurality of archery shots and corresponding arrow-flights. According to one embodiment, the user employs the tuning module 124 to generate one or more recommended adjustments/modifications following a single shot by the archer. In accordance with another embodiment, the user employs the tuning module 124 to generate one or more recommended adjustments/modifications following a plurality of shots by the archer. Further, the process of tuning an archery system is often an iterative process regardless of whether the tuning module provides an output with data from a single shot or from a plurality of shots. That is, one or more shots may be taken with a particular combination of equipment and a particular set of equipment settings. The tuning module 124 can employ the data concerning the shots (flight data, bow data, etc.) and generate the recommended adjustment(s)/modification(s). Thereafter one or more of these recommended changes can be made and the archer can take another shot or series of shots with the new setting(s) and/or equipment combination(s). The tuning module 124 can employ the data concerning the shot(s) (flight data, bow data, etc.) and generate a further recommended adjustment(s)/modification(s) as necessary. The process can be repeated as required until a desired performance of the archery system results.

Accordingly, in some embodiments, the system 120 includes a tuning-history module 128 to track prior flight history and/or prior changes to the equipment combinations or settings concerning the archery system that is being tuned. In accordance with one embodiment, the user supplies the equipment settings and/or equipment combinations that are employed for each shot or shots included in the current test iteration and this information is retained by the system 120 and employed by the tuning history module 128 to evaluate what, if any, adjustments/modifications should be made following later shots. For example, where the tuning module 124 determines that the flight of the arrow can be further improved, another shot or set of shots may be taken with new equipment settings and/or combinations which are entered into the tuning module 124. The tuning-history module 128 can evaluate these subsequent shots in view of the prior tuning history (for example, employing the flight data and/or bow data determined with the prior equipment settings/combinations) to determine what, if any, adjustments/modifications should be made following these shots.

In addition to the preceding, in some embodiments, the system 120 determines arrow velocity (e.g., instantaneous velocity) which can be used to compare the archery system that is being evaluated with model archery systems. In one embodiment, velocity data is employed as a basis for comparison between various bows and/or various combinations of arrows and arrow tips of varying weights, that is, in selecting a suitable equipment combination.

In a further embodiment, the system 120 employs acceleration data received from the electronic apparatus 48 along with a known mass of the arrow 20 equipped with the electronic apparatus to determine the kinetic energy of the arrow at one or more points along the flight path of the arrow. In one embodiment, the kinetic energy is determined for a plurality of points along the flight path of the arrow. In a further embodiment, the kinetic energy is determined for substantially the entire flight path of the arrow. According to one embodiment, the determination of the arrow's kinetic energy is made on a substantially real-time basis. In some embodiments, the system 120 employs values of the kinetic energy provided by various known equipment configurations (for example, model equipment combinations) when generating either or both of the recommended equipment combination and the recommended equipment settings. In further embodiments, the system evaluates the kinetic energy provided by an archery system that is being evaluated in a bow tuning process. Thus, in accordance with various embodiments, any of the equipment selection module 123, the setup module 122 and the tuning module 124 may generate and/or employ data concerning the kinetic energy as determined from the flight data.

Figure 12:
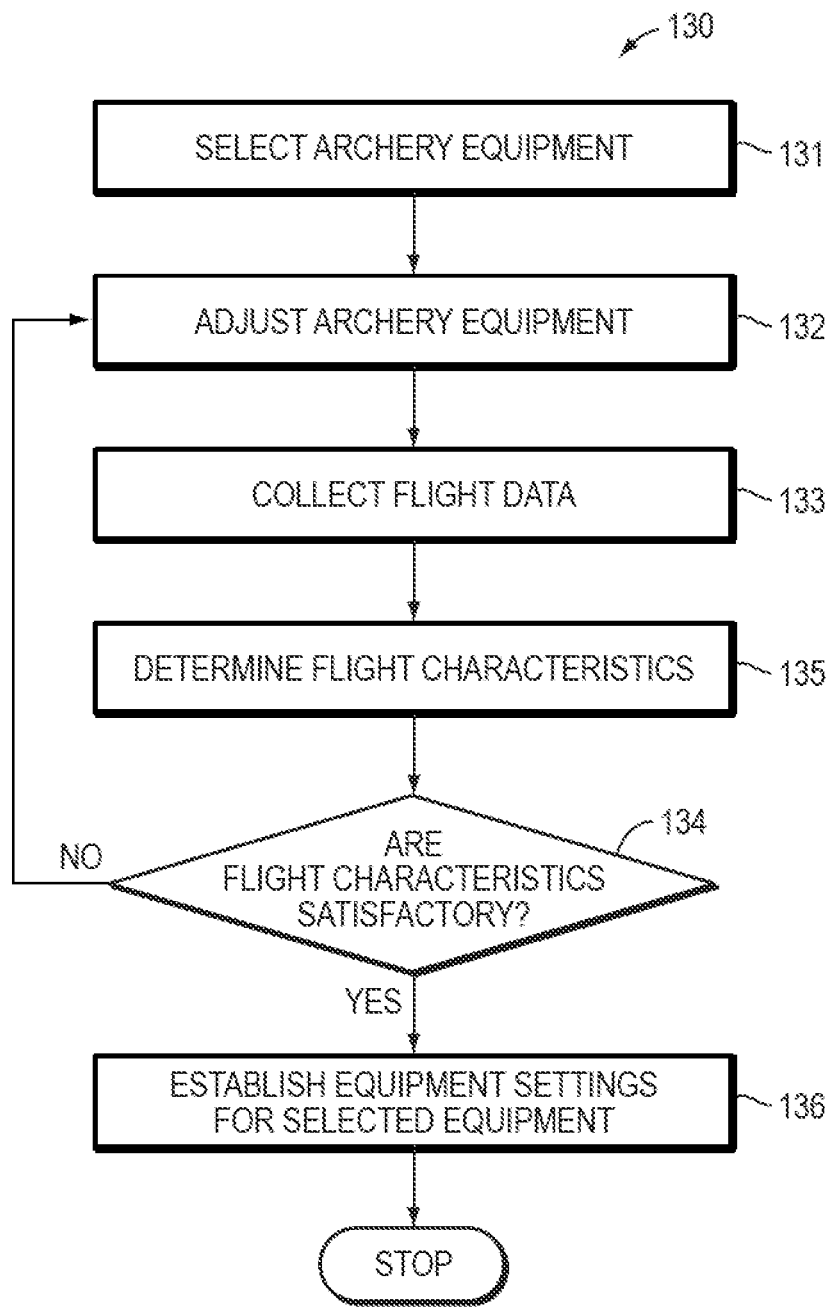
FIG. 12 illustrates a process in accordance with an embodiment of the invention.

In general, embodiments may employ information that is established by a collection of flight data with model archery equipment to better establish the equipment settings that provide sufficient accuracy (for example, an optimum accuracy) with a selected equipment combination. Referring now to FIG. 12, a process 130 for modeling a performance of archery equipment is illustrated in accordance with one embodiment. In some embodiments, the results of the process 130 are provided to the system 120 as known results for a performance of a particular equipment combination. That is, the process 130 can provide recommended equipment settings for a selected equipment combination where the recommended settings are known to result in a satisfactory performance, e.g., they are known to provide an arrow with desired flight characteristics. In some embodiments, the results of the process 130 are employed by the setup module 122 and/or the tuning module 124 to allow an archer to adjust a selected equipment combination for a high level of performance before releasing a shot, and to assist a user in tuning an archery system. In each case, the system 120 includes the information concerning model performance such that a user may refer to it without the need for the user to develop the information concerning the model performance on their own.

That is, in accordance with one embodiment, the modeling is performed prior to shipping the system 120 such that the modeled data is included with the system 120 when it is first used by the user. At act 131, the process begins with a selection of the archery equipment. At act 132, a selected set of adjustments is established for the archery equipment. According to one embodiment, the set of adjustments established at act 132 are an initial set of adjustments for the equipment whose performance is being modeled. At act 133, flight data is collected concerning a flight of an arrow or a group of arrows shot from the bow. In some embodiments, an electronic apparatus included in the arrow (e.g., the electronic apparatus 48) provides the flight data as described above. According to one embodiment, at act 135, the flight characteristics of the arrow are generated from the flight data. For example, an electronic apparatus included in a tip of the arrow may communicate information concerning acceleration data. In one embodiment, the acceleration data is employed to determine the velocity of the arrow. At act 134, the flight characteristics of the arrow or group of arrows is evaluated to determine whether the performance of the archery system is satisfactory.

If the flight characteristics are determined to be satisfactory at act 134, the process 130 moves to act 136 where the set of adjustments established at act 132 are established as preferred equipment settings for the equipment combination that was employed. That is, the set of adjustments are known to provide a high level of performance of the archery system, for example as judged by an ability to provide a desired level of accuracy, speed, low decibel level, consistency, any combination of the preceding or any of the preceding in combination with other performance measurements.

In accordance with one embodiment, if the flight characteristics are found to be unsatisfactory at act 134, the process returns to act 132 where one or more equipment settings may be changed in the interest of improving the performance of the archery system. Once the adjustments have been made in this iteration, at act 132, the process continues at act 133 where additional flight data is collected from a shot or a series of shots with the archery system. Acts 135 and 134 are then repeated to determine whether the flight characteristics are satisfactory. If the flight characteristics are satisfactory, the process is completed following act 136 where this revised set of adjustments is established as preferred equipment settings for the equipment combination that was employed. If the flight characteristics are found to not be satisfactory for one or more reasons (for example, the flight of the arrow is not as stable as desired—as demonstrated by excessive pitch, yaw or roll), the process returns to act 132 where further adjustments are made and the act of collecting flight data is repeated.

Variations of the process 130 can include the addition of one or more acts, the removal of one or more acts or a combination of the preceding. For example, the act 133 may include a single shot or a plurality of shots using a particular set of equipment with a particular set of adjustments.

Figure 13A:
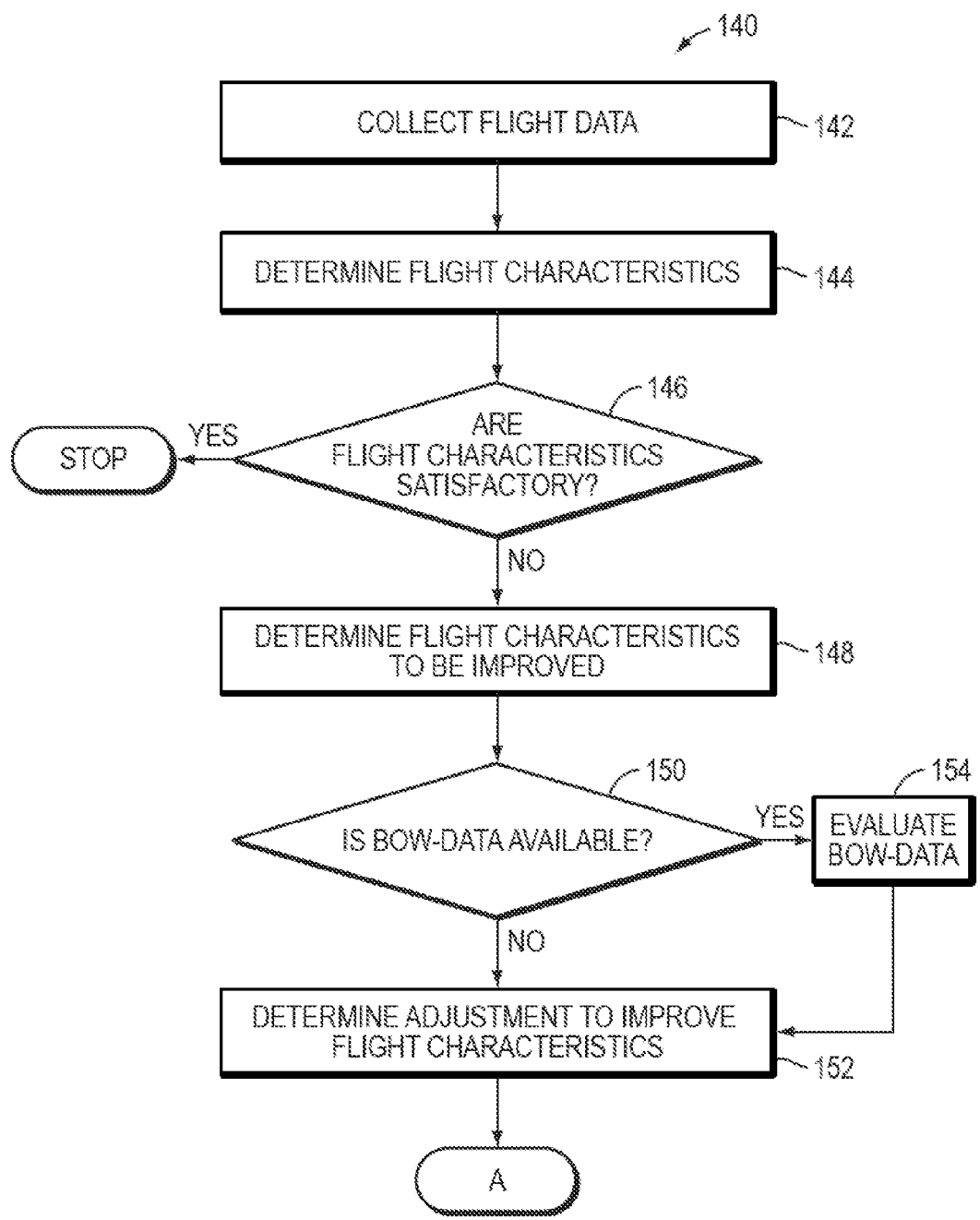
FIGS. 13A and 13B illustrate a process in accordance with another embodiment of the invention.
Figure 13B:
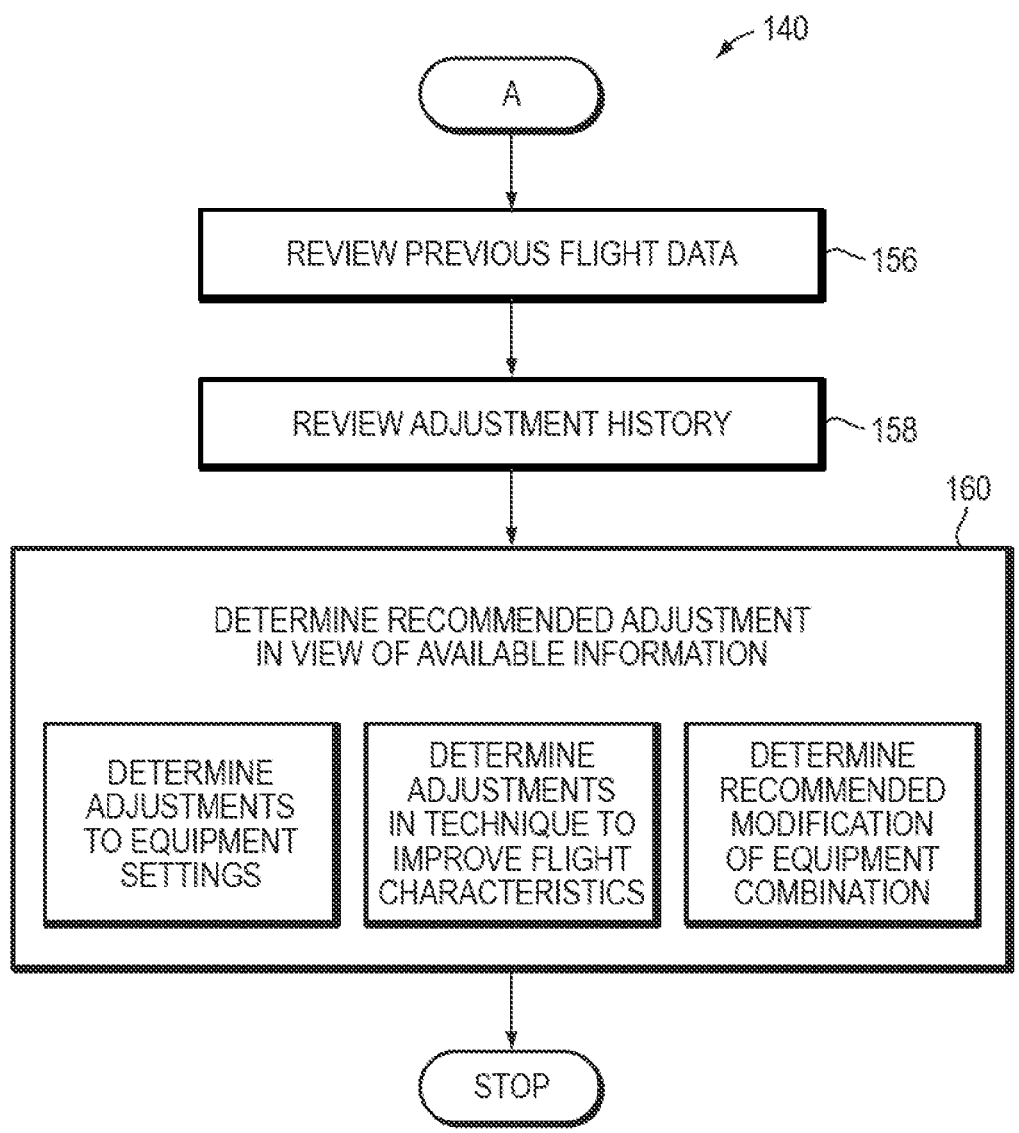

Referring now to FIGS. 13A and 13B, a process 140 for tuning an archery system is illustrated in accordance with one embodiment. In some embodiments, the process 140 employs an embodiment of the system 120.

At act 142, flight data is collected, for example, in some embodiments, an electronic apparatus (e.g., the electronic apparatus 48) is included in an arrow that is shot from a bow for one or a plurality of shots. The electronic apparatus can include one or more sensors to provide data concerning the flight characteristics of the arrow. In one embodiment, the flight data is provided to a tuning module, e.g. the tuning module 124. Some embodiments may also include an act of collecting bow data provided by a bow-mounted sensor. The bow data may also be provided to the tuning module.

At act 144, the flight characteristics are determined from the flight data. At act 146, the flight characteristics are evaluated in view of the model flight characteristics and a determination is made whether the flight characteristics are satisfactory. For example, act 146 may include any or all of: 1) evaluating arrow velocity; 2) evaluating arrow kinetic energy; 3) evaluating the overall stability of the arrow; and 4) evaluating any or all of the pitch, the yaw and the roll of the arrow. The evaluation may concern the flight characteristics at one or a plurality of locations along the flight path of the arrow. In one embodiment, the model flight characteristics are derived using the process illustrated in FIG. 12. In some embodiments, the process illustrated in FIG. 12 is completed by a supplier of a tuning system while in other embodiments the process of generating the model flight data is completed by the user of the system 120. If the flight characteristics are satisfactory, the process 140 is complete and therefore stops. In one embodiment, the process 140 moves to act 148 if the flight characteristics are determined to be unsatisfactory. In some embodiments, a comparison module is employed as a part of either or both of acts 144 and 146, e.g., the comparison module 126.

As mentioned above, bow-data may be employed in the tuning process in accordance with some embodiments. At act 150 of the illustrated embodiment, a determination is made whether any bow-data is available in addition to the flight data. If bow-data is unavailable, the process 140 moves to act 152 in accordance with the illustrated embodiment. According to this embodiment, at act 152, a determination is made concerning what adjustments can be made to improve the flight characteristics.

If bow-data is available, the process moves to act 154 where the bow-data is evaluated to determine whether the archer's technique negatively impacted the flight characteristics of the arrow or arrows. Here too, data (e.g., the bow-data) collected for the archery system that is being tested may be compared against bow-data established for a model equipment combination. This comparison may, for example, be employed to determine whether the cams need adjustment, the effect of noise silencing equipment on system performance and/or the effect of the archer's technique on the flight characteristics. According to one embodiment, the process 140 moves to act 152 following act 154. In this embodiment, where bow-data is available, act 152 can determine the adjustments to improve the flight characteristics in view of both the flight-data and the bow-data.

In accordance with the illustrated embodiment, the process moves to act 156 following the act 152. At act 156, previous flight data for the archer and/or equipment combination is reviewed where it is available. In accordance with one embodiment, act 156 is performed at least in part using a tuning module, for example, using the comparison module 126.

According to the illustrated embodiment, the process moves to act 158 following act 156. In some embodiment, act 158 includes a review of an adjustment history for the tuning process for the archer and the equipment combination being evaluated. In accordance with one embodiment, act 158 is performed at least in part using a tuning-history module, for example, the tuning-history module 128.

In accordance with the illustrated embodiment, the process 140 moves from act 158 to act 160 where a determination is made concerning a recommended adjustment. The result of act 160 may be the generation of any one or more of: 1) a recommended adjustment to the equipment settings; 2) a recommended adjustment to the technique of the archer; and 3) a recommended modification of the equipment combination.

Thus, in accordance with one embodiment, the determination made at act 152 can be further evaluated and refined in view of historical information concerning prior shots and/or adjustments. In accordance with another embodiment, the act 156 is not included in the process 140. In another embodiment, the act 158 is not included in the process 140. In a further embodiment, neither of the acts 156 and 158 are included in the process 140.

Variations of the process 140 can include the addition of one or more acts, the removal of one or more acts or a combination of the preceding. For example, the act 142 may be applied to a single shot or a plurality of shots using a particular set of equipment with a particular set of adjustments. That is, according to various embodiment, the acts that follow the act 142 in the process 140 may be based on an evaluation of flight data collected for a single shot, flight data collected for a plurality of shots or an average of flight data for a plurality of shots.

In various embodiments, the system 120 is included in a device that includes a user interface such that a user can enter the information concerning the equipment combination and review the equipment parameters generated by the setup module. In some embodiments, the user is also the archer while in other embodiments the user may not be the archer. For example, the user may be an archery instructor or archery sales personnel.

In another approach, a user may review the information provided by the setup module as part of the selection process when selecting and/or purchasing equipment. For example, a user may locate a particular model of bow (by, for example, their preferred manufacturer) that provides a desired level of accuracy when the user's preferred equipment settings and/or equipment combinations are employed with the bow. That is, the user may first select one or more equipment settings such as draw weight, arrow length, arrow mass, tip mass, etc. that they prefer to use and then locate a bow that performs well with the preferred equipment settings. Further, in some embodiments, the user may select one or more elements of the equipment combination to employ with the additional piece of equipment that is to be determined. For example, the type of release aid (which may include none, or a particular style and/or type) may already be determined by the user based on their preference. According to one embodiment, the setup module 122 can provide the user with information concerning one or more makes and models of bow that work well in providing a desired degree of performance (e.g., accuracy) with the preferred release.

Various embodiments of the system 120 may be include hardware, software or a combination of hardware and software. In some embodiments, the system 120 is included in a processing device which can include one or more processors and/or other elements of a computing system. In some embodiments, the system 120 may be included as an element of the base station 88, for example, the system 120 can be included in the processor 98. Accordingly, in some embodiments, the system 120 is included in a control unit that includes a display and a user input device. In other embodiments, the system 120 may be included as a separate element of the base station 88. In another embodiment, some elements of the system 120 are included in the base station and other elements of the system are included elsewhere. In a further embodiment, one or more elements of the system 120 may be located remote from the user, for example, on a remote server where the user can access them over a wide area network. Accordingly, in one embodiment, the user can employ the base station 88 to access the Internet where information concerning the selection and/or tuning of archery equipment and archery systems is available.

Figure 15A:
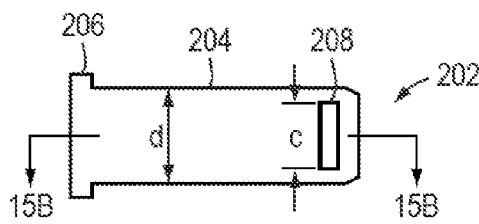
FIGS. 15A-15C illustrate an insert in accordance with one embodiment of the invention.
Figure 15C:
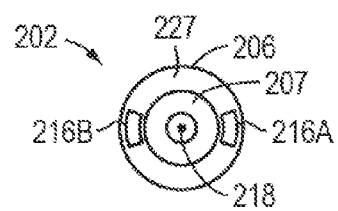
Figure 15B:
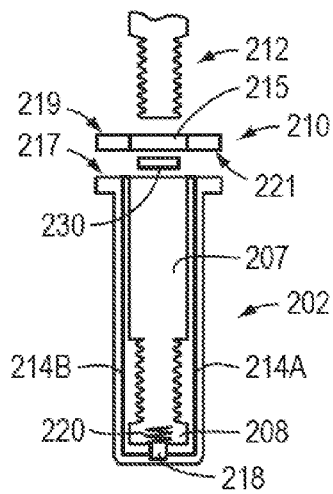

As mentioned above, in various embodiments components of the electronic apparatus 48 can be included in an arrow tip and in other portions of an arrow. FIGS. 15A-15C illustrate an embodiment in which a portion of the electronic apparatus 48 can be coupled to a power source (e.g., the power source 78) located external to the arrow tip. Referring now to FIG. 15A, an adapter 202 is illustrated in accordance with one embodiment. In accordance with one embodiment, the adapter 202 is configured to comply with applicable standards by any of the AMO, the ATA and the ASTM such as those published in AMO Standards Committee "Field Publication FP-3" (2000).

In various embodiments, the adapter 202 is configured to retain one or more portions of the electronic apparatus 48. For example, in one embodiment, the adapter 202 includes a power source for the electronic apparatus (e.g., the power source 54, the power source 78). In the illustrated embodiment, the adapter 202 includes a body 204, a flange 206 and a cavity 208. In some embodiments, the cavity 208 is configured to retain the power source for the electronic apparatus 48. In accordance with one embodiment, the adapter 202 includes a diameter d that is sized to allow the adapter 202 to be inserted within an arrow shaft (e.g., the shaft 22), for example, a shaft made of aluminum, carbon fiber or other materials. In one embodiment, the adapter 202 includes a diameter d less than or equal to approximately 5 mm (e.g., for use with a carbon fiber arrow shaft). In another embodiment, the adapter 202 includes a diameter d that is less than or equal to approximately 7 mm (e.g., for use with an aluminum arrow shaft).

In some embodiments, the power source includes one or more batteries such as a coin cell battery (e.g., a "button cell"). Accordingly, in various embodiments, the cavity 208 is configured to retain one or more coin cell batteries. For example, the cavity 208 may include a diameter c that is sized to allow the insertion and retention of a battery such as a coin cell battery. In a further embodiment, the cavity c may include one or more springs (e.g., leaf springs) that assist in retaining the battery in the cavity 208. According to one embodiment, the adapter 202 and the cavity 208 are configured to allow a removal and replacement of the power source. In an alternate embodiment, the power source included in the adapter 202 is not removable. Regardless of whether the power source can be removed from the adapter 208, in some embodiments, the power source retained in the cavity 208 is a rechargeable power source.

In accordance with one embodiment, the power source is a coin cell having an ISO/IEC 83-3 diameter code of 6 or less to allow the power source to fit within the interior diameter of an arrow shaft.

FIG. 15B is an exploded view that includes a cross section of each of the adapter 202 of FIG. 15A, a power source 230, a contact element 210 and an arrow tip 212 in accordance with one embodiment. In various embodiments, the arrow tip 212 can include all or a portion of the electronic apparatus 48. According to the illustrated embodiment, the arrow tip includes all of the electronic apparatus 48 except for the power source. In the illustrated embodiment, the power source 230 can be included in the adapter 202, for example, in the cavity 208.

In accordance with various embodiments, the adapter 208 includes a receptacle 207 configured to receive the shaft 224

(including the threaded region 226). In one embodiment, the cavity 208 and the receptacle 207 are open to one another.

FIG. 15C illustrates the adapter 202 when viewed from the end at which the flange 206 is located, i.e., when viewed from the distal end of the adapter. In various embodiments, the flange includes one or more electrical contacts 216A, 216B.

As illustrated in FIG. 15B, in a further embodiment, the adapter 208 includes one or more conductors 214A, 214B that are connected to the corresponding electrical contacts 216A, 216B located at a surface 217 of the flange 206. In one embodiment, the adapter 202 also includes a contact 218 and spring 220. The contact 218 is also illustrated in FIG. 15C where it is exposed according to one embodiment when viewed through the receptacle 207 and the cavity 208 (e.g., without either the arrow tip 212 inserted in the adapter 202 or a power source located in the cavity 208).

The surface may include a single electrical contact or a plurality of electrical contacts. Further, in various embodiments, the entirety of the surface 217 is conductive. Alternatively, the surface 217 can include at least a region 227 that includes a material with suitable dielectric properties to act as insulation between two or more conductive regions (e.g., between the electrical contacts 216A, 216B).

In accordance with one embodiment, the contact element 210 provides one or more electrical contacts at each of a first surface 219 and a second surface 221 of the contact element 210. In some embodiments, the contact element 210 provides a level of resilience such that adequate contact pressure is maintained for an electrical connection between the adapter 202 and the arrow tip 212. For example, according to one embodiment, the contact element 210 includes a lock washer-style construction such that the contact element 210 is compressed between the flange 206 of the adapter 202 and arrow tip 212 when the arrow tip 212 is connected to the adapter 202. Such an approach can assist in maintaining the electrical connection between the power source and portions of the electronic apparatus 48 that are located in the arrow tip 212 despite the forces (e.g., shock and vibration) that the arrow and the arrow tip are routinely subject to when shot from a bow and upon striking a target.

In an alternate embodiment, the contact element 210 is configured as a standard flat washer and adequate contact pressure is maintained. In a further embodiment, the contact element 210 is configured as a flat washer that includes an element of resiliency to provide contact pressure of at least a portion of an electrical contact surface provided by the contact element 210. Embodiments of the contact element 210 may include any suitable electrical conductor such as copper, aluminum, AL/CU alloy, silver, gold, platinum, etc. Further, in various embodiments, the entirety of the first surface 219 and the second surface 221 are conductive. In a further embodiment, the contact element 210 may only include electrically conductive material. Alternatively, the contact element 210 can include some portions that are electrically conductive and other portions that include a material with suitable dielectric properties to act as insulation between two or more conductive regions of the contact element 210. Further embodiments include an opening 215 to allow the insertion of the shaft 224 of the arrow tip 212.

Figure 15D:
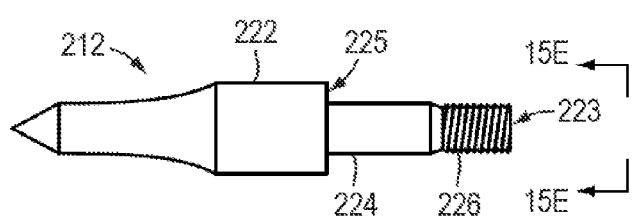
FIGS. 15D and 15E illustrate an arrow tip that can employed with the insert of FIGS. 15A-15C in accordance with one embodiment of the invention.
Figure 15E:
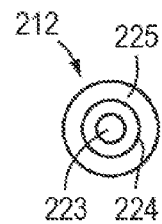

Referring now to FIGS. 15D and 15E, further details of the arrow tip 212 are illustrated in accordance with one embodiment. In the illustrated embodiment, the arrow tip 212 includes a body 222, a shaft 224 including a threaded region 226, a first electrical contact surface 223 located at a proximate end of the shaft 224 and a second electrical contact surface 225 located coaxially about a longitudinal axis of the arrow tip 212 at the proximate end of the body 222. Each of the first electrical contact surface 223 and the second electrical contact surface 225 may include only electrically conductive material, or alternatively, can include some portions that are electrically conductive and other portions that include a material with suitable dielectric properties to provide electrical insulation between two or more conductive regions of the respective contact surface. Further, in some embodiments, the contact surfaces 223, 225 each include a single contact. In other embodiments, either or both of the contact surfaces 223, 225 include a plurality of contacts. For example, two or more contacts separated by a suitable electrical insulating material.

Embodiments of any of the conductors 214A and 214B, the contact 218, the electrical contacts 216A and 216B, the spring 220, the first electrical contact surface 223 and the second electrical contact surface 225 may include any suitable electrical conductor such as copper, aluminum, AL/CU alloy, silver, gold, platinum, etc.

In accordance with one embodiment, a power source 230 is located in the cavity 208 where a first electrode of the power source is placed in contact with the contact 218. In accordance with this embodiment, the conductors 214A and 214B provide a circuit that connects the first electrode of the power source to the electrical contacts 216A and 216B located at the surface 217. The shaft of the arrow tip 212 can be inserted through the opening 215 and the arrow tip can be connected to the adapter 202 with the contact element "sandwiched" between the second electrical contact surface 225 of the arrow tip 212 and the surface 217 of the adapter 202. Accordingly, the first electrode of the power source is connected to at least some of the circuitry of the electronic apparatus 48 located in the arrow tip 212. According to the illustrated embodiment, the connection is made via the contact 218, either or both of the conductors 214A and 214B, the contact element 210 and a contact located in the electrical contact surface 225.

In accordance with one embodiment, a second electrode of the power source 230 is exposed to the receptacle 207 of the adapter 202 when the power source is located in the cavity 208 such that the first contact surface 223 of the arrow tip 212 is pressed into contact with the second electrode of the power source when it is attached to the adapter, e.g., when the arrow tip 212 is threaded into the adapter 202. As indicated above, a spring 220 can be located in the cavity 208 where it can assist in providing sufficient contact pressure between the second electrode and the first contact surface 223 by forcing the power source 230 (e.g., a coin cell) in a direction of the arrow tip 212. In one embodiment, the spring includes an electrical conductor that can provide a connection between the contact 218 and an electrode of the power source. Thus, the second electrode of the power source is connected to at least some of the circuitry of the electronic apparatus 48 located in the arrow tip 212. According to the illustrated embodiment, the connection is made via a contact located in the first electrical contact surface 223.

Popular materials of construction for arrow shafts can be conductive, for example, each of aluminum and carbon fiber. Accordingly, in some embodiments, portions of the adapter 208 include material having a sufficient dielectric to provide electrical insulation. In these embodiments, the insulating material can be used to electrically isolate the conductive parts (e.g., the conductors 214A, 214B, the contact 218, etc.) of the adapter 208 as required for reliable operation of the electronic apparatus 48. For example, the conductors 214A, 214B can be isolated from the exterior walls (or the interior walls) of the adapter 202 such that the adapter 202 can be inserted in an arrow shaft that includes conductive material.

Further, in an embodiment, where each of a positive conductor and a negative conductor are included in the adapter 202, insulating material can electrically isolate these two types of conductors to prevent a short circuit, for example, between a positive electrode and a negative electrode of a power source.

According to various embodiments, the adapter 202 can be employed with a variety of types of electronic apparatus included in the arrow (e.g., in the arrow tip, in the arrow, etc). That is, embodiments of the adapter 202 can be employed with electronic apparatus including locating devices, game-tracking devices, cameras, microphones, etc.

In some embodiments, one or more components of the electronic apparatus 48 can be located elsewhere in the arrow 20. Further, in one embodiment, all or a portion of the electronic apparatus is located in the nock 28.

In accordance with various embodiments, a user may include any individual who is employing one or more of the systems, apparatus and/or methods described herein. The user may be the archer (that is, the operator of the bow). The user need not be an archer, however, and may instead be an instructor, technician, archery pro, coach, sales staff, etc.

In some embodiments, a bow tuning process may be performed with software, for example, software that may be loaded on the base station 88. Accordingly, in some embodiments, a computer readable medium is encoded with a program for execution on a processor, the program when executed on the processor performing a method of improving a performance of an arrow shot from a bow. According to one embodiment, the method includes collecting data with a sensor included in the arrow, the data concerning flight characteristics of the arrow when shot from the bow, and generating, based on the collected data, at least one recommended adjustment to improve a subsequent flight of the arrow.

This is just one example of such an embodiment. Other embodiments, including those directed to determining flight characteristics without performing any tuning may also be similarly stored and executed.

Any of the above-described embodiments, may be included in a computer system. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor. Such a computer system generally includes a processor connected to one or more memory devices, such as a disk drive memory, a RAM memory, or other device for storing data. The memory is typically used for storing programs and data during operation of the computer system. Software, including programming code that implements embodiments of the present invention, is generally stored on a computer readable and/or writeable nonvolatile recording medium and then copied into memory wherein it is then executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

Having thus described several aspects of at least one embodiment of this invention, it is to be appreciated various alterations, modifications and improvements will readily occur to those skilled in the art. Such alterations, modifications and improvements are intended to be part of this disclosure and are intended to be within the spirit and scope of the invention. Accordingly, the foregoing description and drawings are by way of example only.

What is claimed is:

1. A system for tuning archery equipment, the system comprising:
    an arrow-mounted sensor configured to provide data concerning at least one flight characteristic of an arrow shot from a bow; and
    a processing device configured to receive data provided by the arrow mounted sensor and to generate information concerning an adjustment of the archery equipment to improve a performance of arrows shot from the bow based at least in part on the data provided by the arrow-mounted sensor.

2. The system of claim 1, wherein the system includes a control unit comprising the processing device, a display and a user input device.

3. The system of claim 2, wherein the control unit is configured to display the information concerning the adjustment of the archery equipment on the display.

4. The system of claim 2, wherein the control unit is configured to update the information concerning the adjustment of the archery equipment in response to information supplied by a user via the user input device.

5. The system of claim 1, wherein the processing device includes a mobile phone including a display.

6. The system of claim 5, wherein the information is provided in the display.

7. A system comprising:
    an arrow-mounted device configured to provide flight data for an arrow shot from a bow; and
    a processing device configured to receive the flight data provided by the arrow-mounted device and to determine at least one quantified value from the flight data.

8. The system of claim 7, wherein the processing device is configured to provide at least one measurement from the flight data.

9. The system of claim 7, wherein the processing device includes a mobile phone including a display.

10. The system of claim 9, wherein the information is provided in the display.

11. The system of claim 7, wherein the system is configured to measure a performance of at least one of the arrow and the bow.

12. The system of claim 7, wherein the arrow-mounted device is removably attached to the arrow.

13. The system of claim 12, wherein the arrow-mounted device is configured as a direct replacement for a conventional archery component.

14. The system of claim 13, wherein the system is configured to provide data for use in tuning archery equipment, and wherein the at least one quantified value provides feedback concerning a performance of at least one of the bow, the arrow and an archer.

15. A method of tuning archery equipment including an arrow and a bow, the method comprising:
    generating, with a sensor included in the arrow, data concerning at least one flight characteristic of the arrow when shot from the bow; and
    generating information concerning an adjustment of the archery equipment to improve a performance of the arrow when shot from the bow based at least in part on the data provided by the sensor.

16. The method of claim 15, further comprising generating the information using a mobile phone.

17. The method of claim 16, wherein the mobile phone includes a display, and wherein the method further comprises displaying the information in the display.

18. The method of claim 17, further comprising receiving, with the mobile phone, a user input concerning the shot.

19. A computer readable medium encoded with a program for execution on a processor, the program when executed on the processor performing determining a value concerning an arrow shot from a bow, the method comprising acts of:
- receiving flight data generated with a sensor included in the arrow when shot from the bow; and
- determining at least one quantified value from the flight data.

* * * * *